(12) United States Patent
Wakui et al.

(10) Patent No.: US 6,359,361 B1
(45) Date of Patent: Mar. 19, 2002

(54) ARMATURE WINDING AND ROTATING ELECTRIC MACHINE USING THE SAME

(75) Inventors: Shinichi Wakui; Miyoshi Takahashi, both of Hitachi; Kazumasa Ide, Hitachiota; Ryoichi Shiobara, Hitachi; Hidenari Otani, Hitachi; Akitomi Semba, Hitachi; Junji Sato, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/659,820

(22) Filed: Sep. 11, 2000

(30) Foreign Application Priority Data

Feb. 25, 2000 (JP) .......................................... 2000-054358

(51) Int. Cl.[7] ................................................. H02K 1/00
(52) U.S. Cl. ........................ 310/179; 310/180; 310/198; 310/216
(58) Field of Search ................................. 310/179, 180, 310/184, 187, 189, 208, 216, 198, 185

(56) References Cited

U.S. PATENT DOCUMENTS

| | | | | |
|---|---|---|---|---|
| 3,806,785 A | * | 4/1974 | Devalroger et al. | ........ 318/254 |
| 4,048,528 A | * | 9/1977 | Whitney | ........ 310/54 |
| 4,890,049 A | * | 12/1989 | Auinger | ........ 318/771 |
| 5,122,705 A | * | 6/1992 | Kusase et al. | ........ 310/68 D |

* cited by examiner

Primary Examiner—Nestor Ramirez
Assistant Examiner—Thanh Lam
(74) Attorney, Agent, or Firm—Antonelli, Terry, Stout & Kraus, LLP

(57) ABSTRACT

In order to make any voltage imbalance between the winding circuits of each phase small and to simplify the edge structure of the armature winding, in a rotating electric machine of four poles, having slots of 9n ($1 \leq n \leq 7$) pieces provided for the stator core with a double-layer winding per each slot, and an armature winding of three-phase star connection being constituted with three winding circuits connected in parallel in each phase, two of the four poles of each phase are constituted with only one of the three winding circuits.

10 Claims, 18 Drawing Sheets

(PRIOR ART)

*(PRIOR ART)*

ARMATURE WINDING AND ROTATING ELECTRIC MACHINE USING THE SAME

BACKGROUND OF THE INVENTION

The present invention relates to a rotating electric machine of four poles and an armature winding of three-phase circuit thereof formed with three winding circuitry every each phase in parallel and mounted in double-layer winding in several slot provided in a stator core.

For example, in Japanese Patent Laid-open 9-205750 bulletin, a rotating electric machine in which voltage unbalance between winding circuitries is improved by specially arranging a coil constituting each winding circuitry in case of number 72 of a stator slot, is disclosed.

When the coil constituting each winding circuitry is connected with a coil end, if all winding pitch cannot be constant, a winding pitch of the specified coil is changed as mentioned in Japanese Patent Publication No. 54-6683 bulletin, for example.

Conventionally, for example, in a rotating electric machine of three-phase, four poles, stator slot number 72, a coil arrangement that voltage unbalance between three winding circuitries becomes small is suggested, and the slot number is limited to be 72. Therefore, according to the capacity increasing of the generator, when the slot number is reduced than 72, it is necessary to find a suitable coil arrangement for the slot number.

SUMMARY OF THE INVENTION

In a rotating electric machine of three-phase circuit, four poles, stator slot number 63, having an armature winding in which three winding circuitries connected in parallel, every each phase, an object of one of this invention is to provide the armature winding of the rotating electric machine and the rotating electric machine that the voltage unbalance between the winding circuitries of each phase is small and edge construction of the armature winding does not become complicated.

In order to achieve the above object, according to an aspect of the present invention, in a case of a three-phase circuit and stator slot number 54, four poles P1, P2, P3, P4 are constituted with first to third winding circuitries in each phase as follows.

Pole P1: said first winding circuitry provided with all five top coils and bottom coils, pole P2: said first winding circuitry provided with third top coil and a bottom coil from a winding axis of the pole P2, and said third winding circuitry provided with first, second and fourth top coils and bottom coils from said winding axis of the pole P2, pole P3: said second winding circuitry provided with all five top coils and bottom coils, and pole P4: said second winding circuitry provided with a third top coil and a bottom coil from a winding axis of the pole P4, and said third winding circuitry provided with first, second and fourth top coils and bottom coils from said winding axis of the pole P2.

As the each winding circuitry does not provided more than three poles each three, when the winding circuitry of said each phase is constituted as above, there is no need to increase a number to cross over, and the voltage unbalance between each winding circuitries can be turned into 1.5% around, too. Thereby, in a rotating electric machine of four poles and three-phase comprising the slots less than 63 and an armature winding mounting in parallel the three winding circuitry every each phase, it is provided an armature winding of a rotating electric machine and a rotating electric machine in which the voltage unbalance between winding circuitries of each phase is small and an edge construction of the armature winding does not become complicated.

According to another aspect of the present invention, a rotating electric machine of four pole provided with a three-phase and star connection, each of said three-phase being constructed with three winding circuitries in parallel, having a stator core provided with slots of 9n ($2 \leq n \leq 7$) pieces, each of said slot being provided with double-layer windings, further comprises two of said four poles in said each phase being constituted with only one of said three winding circuitries.

According to another aspect of the present invention, a rotating electric machine of four pole provided with a three-phase and star connection, each of said three-phase being constructed with three winding circuitries in parallel, having a stator core provided with slots of 54 pieces, each of said slot being provided with double-layer windings, further comprises two of said four poles in said each phase being constituted with only one of said three winding circuitries.

The rotating electric machine such as a generator has a stator and a rotor, the stator core constructed with thin plates of multi-layer, and plural slots are provided in the internal circumference side of the stator in order to wind the armature winding. In the generator, as it is desirable for the waveform of the induced voltage to be complete sine wave shape, magnetic flux density distribution of air gap should be a sine-wave form. When the armature winding is provided with a concentrated winding, the magnetic flux density distribution becomes to be a square wave, and it is quite different from a sine-wave distribution. Accordingly the armature winding should be provided with a distributed winding.

On the other hand, the windings that the winding pitch is equal to a pole pitch, is called as a full pitch winding, the windings that the winding pitch is shorter than the pole pitch, is called as a short-pitch winding. Generally, the generator is provided with the short-pitch winding in order to bring the magnetic flux density distribution close to the sine-wave form further.

In case of a turbine generator, a dipoles machine is mostly used in the thermal power generator, however a four pole machine is used in an atomic-power generator. Generally an armature winding of the turbine generator is Y connection, the number of the winding circuitry every each phase becomes to be a divisor of the number of the poles. This is because when the number of the winding circuitry of each phase is the divisor of number of pole, as the coil which constitutes each winding circuitry is capable to be provided with completely the same arrangement electrically, and it becomes possible to make the induced voltage between each winding circuitry balanced.

By the way, when the number of the winding circuitry every each phase is three, the construction of the generator can be streamlined than a case in the four line circuitry. However, in the four pole machine, because the number of the winding circuitry of the armature winding is not a divisor of the number of the poles, the induced voltage of the three winding circuitry apt to be unbalance. Accordingly when the number of the winding circuitry of each phase is provided with 3 in the four pole machine, it is necessary for the voltage unbalance between the winding circuitry to become small.

In late years, a single capacity of the generator is in an increasing trend, and when the capacity of the generator becomes big, because the power factor is almost the same, the product of the voltage and the current of the generator should be increased. However, by a proof pressure of insulation to be used for the coil of the armature winding, terminal voltage of the generator is limited. In such a case, the terminal voltage is held down by reducing the number of the stator slot, and the armature current is provided to be big. That is to say, if the number of the slot is reduced, number of the top coil and the bottom coil constituting one winding circuitry decreases, and the terminal voltage is capable not to be high, it becomes possible to make the cross section of the coil big and to make armature current big, because the slot width can be broad according to the decreasing of the number of the slot.

DETAILED DESCRIPTION OF THE PREFERRED EMBODIMENT

An embodiment of the present invention will be explained using a drawing in detail as follows.

Figure 1:
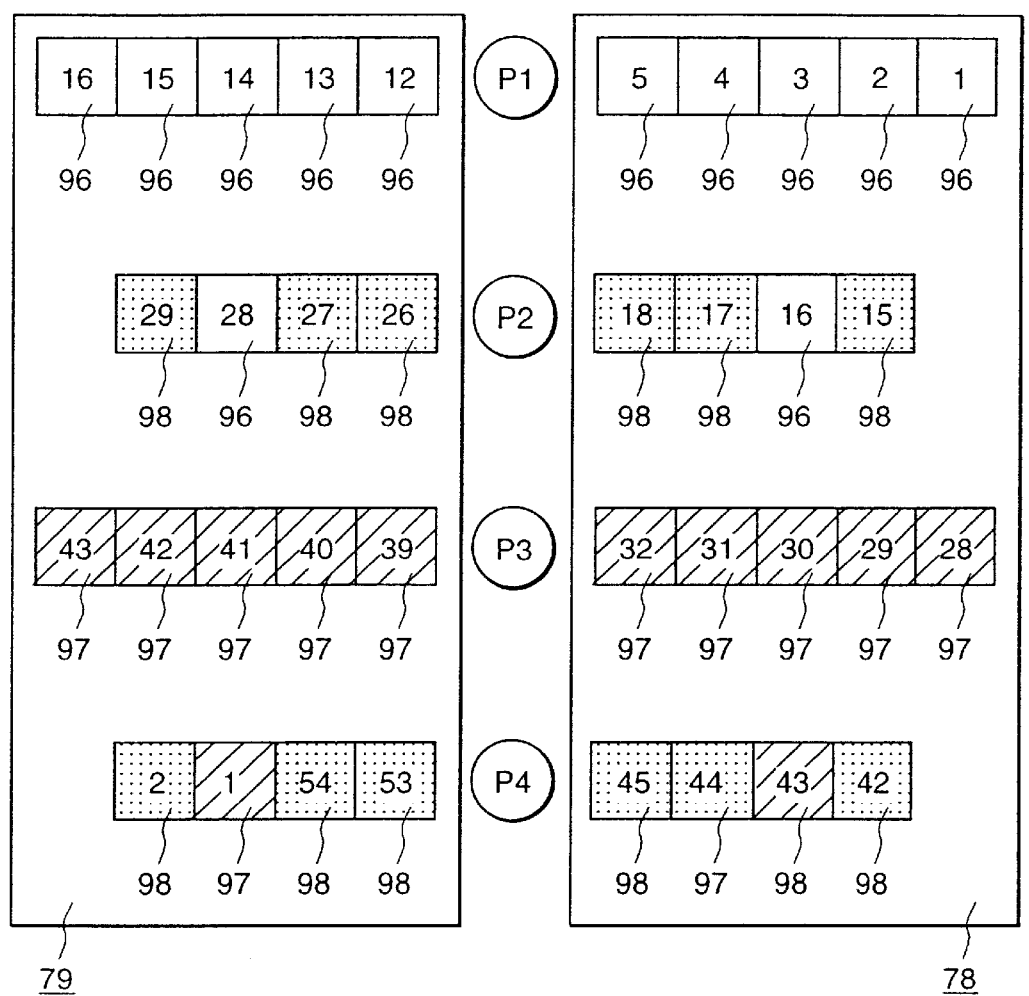
FIG. 1 is a coil arrangement view of the armature winding of one phase of a rotating electric machine shown as one embodiment of the present invention.
Figure 2:
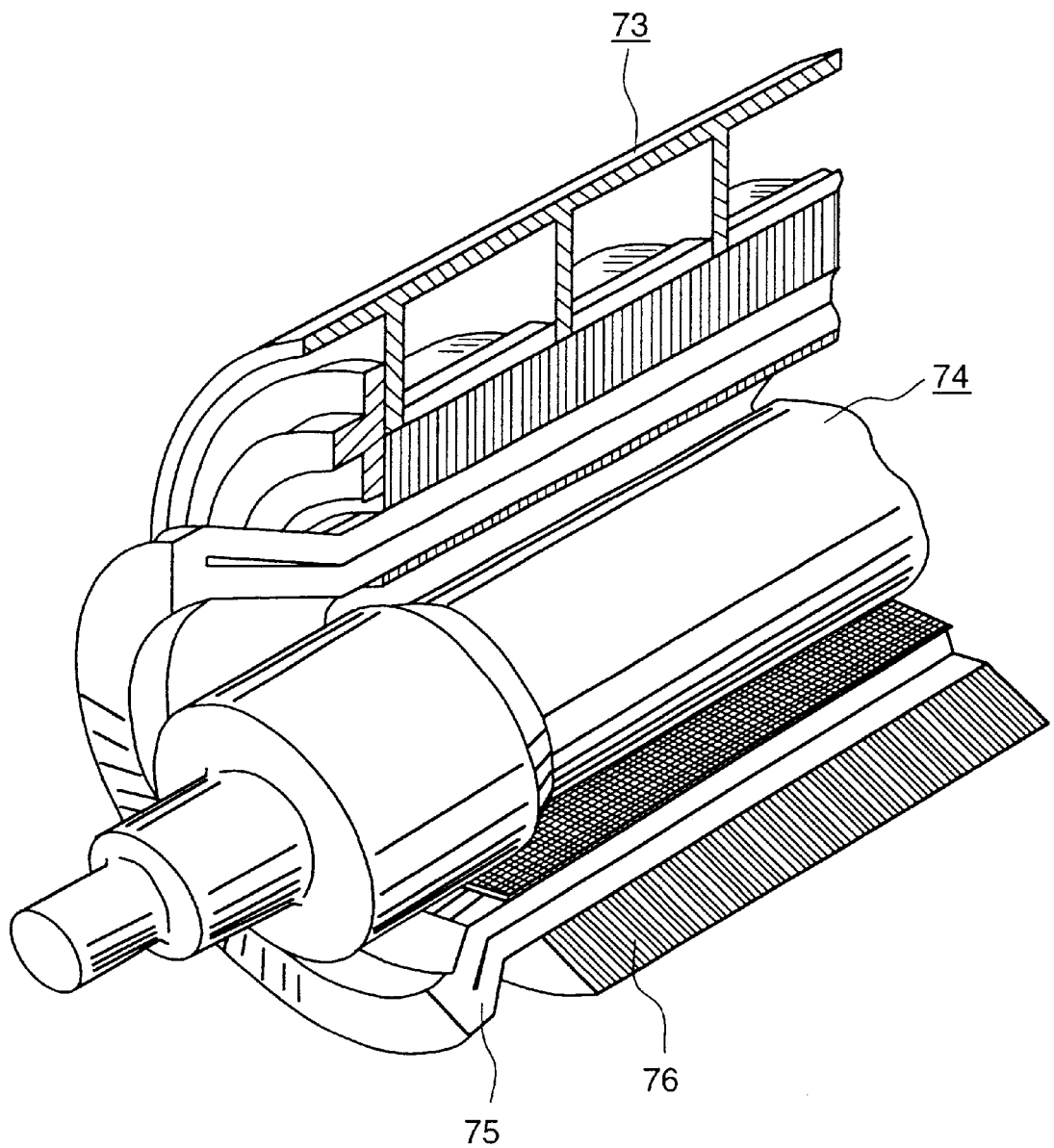
FIG. 2 is a contour construction view of a turbin generator as one embodiment of the present invention.
Figure 3A:
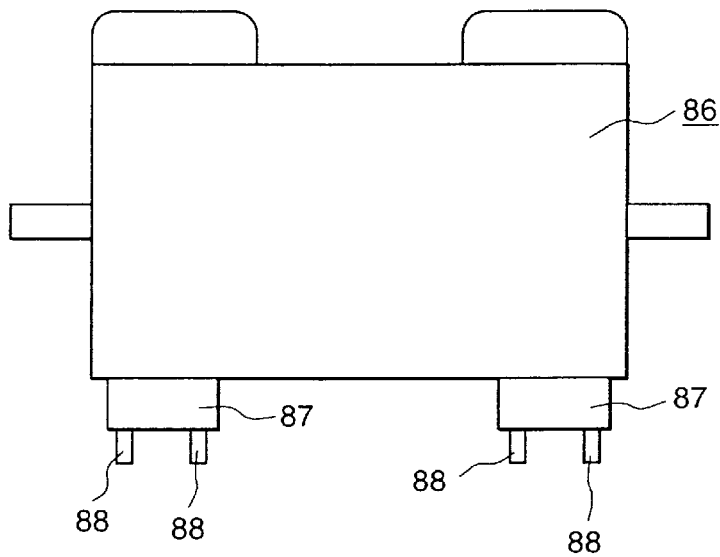
FIGS. 3A, 3B is a conventional three-phase four winding circuitry conceptual diagram per one.
Figure 3B:
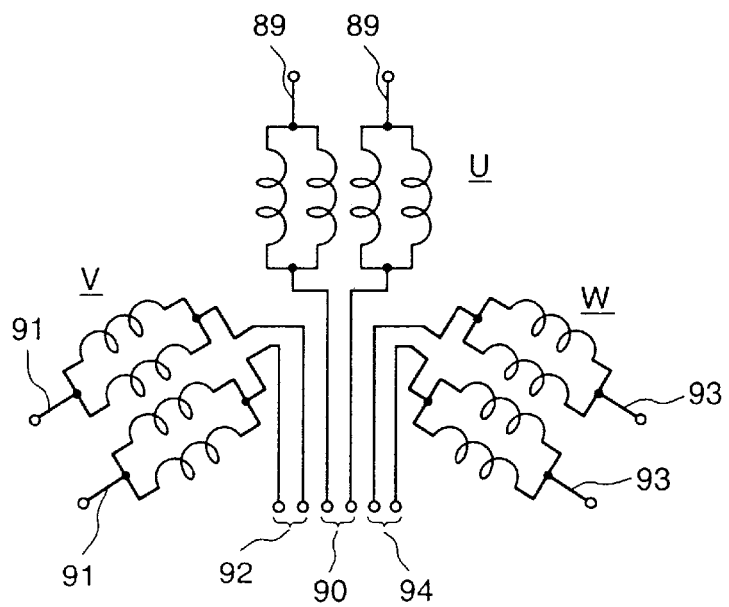
Figure 4A:
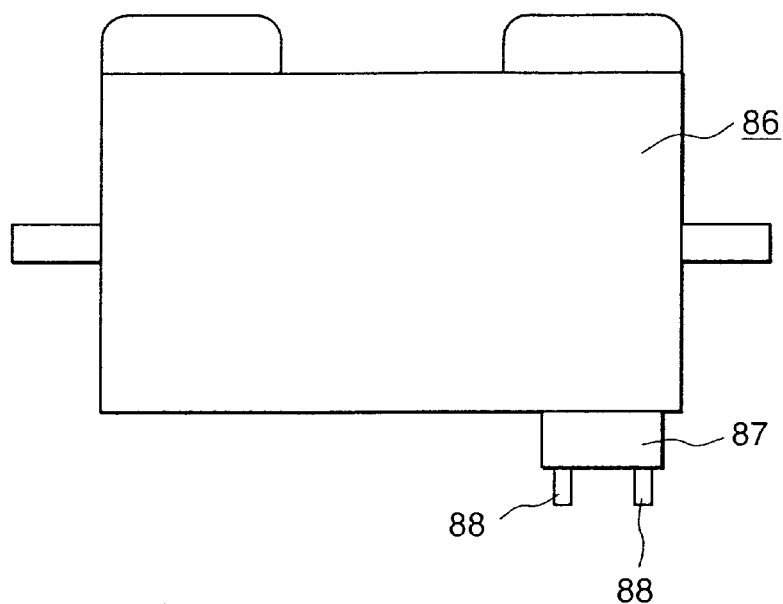
FIGS. 4A, 4B is a three-phase four winding circuitry conceptual diagram per one phase as one embodiment of the present invention.
Figure 4B:
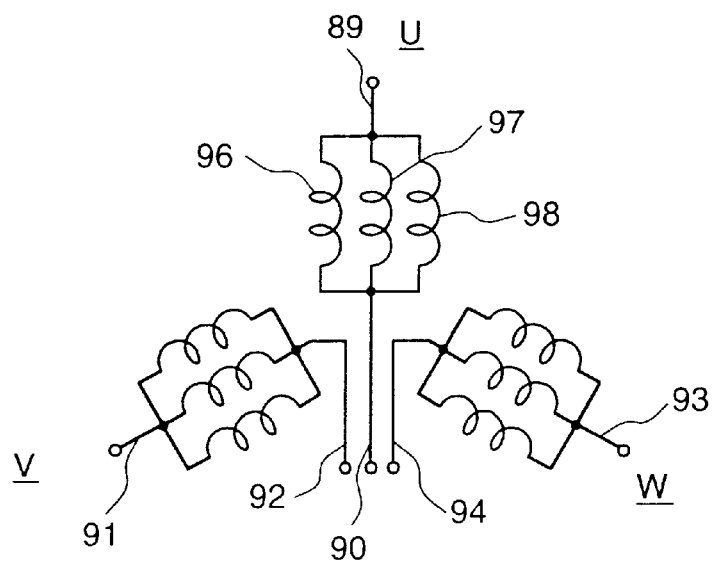
Figure 5:
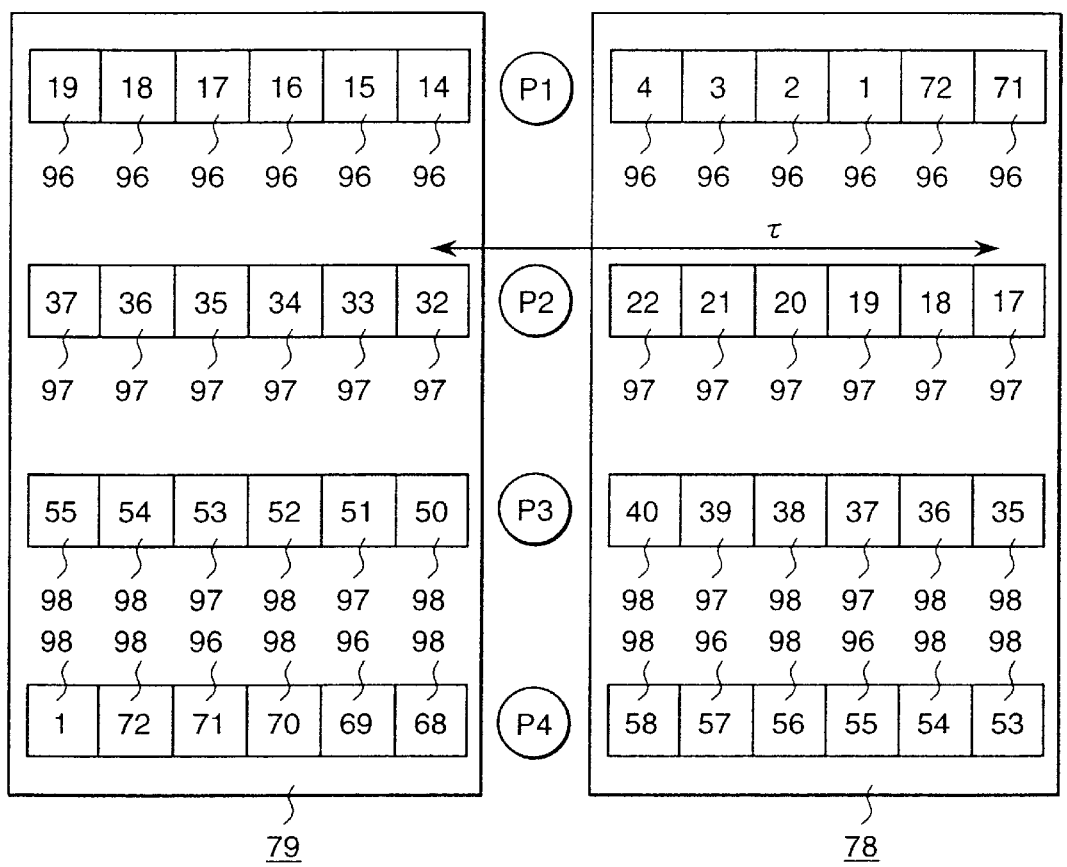
FIG. 5 is a conventional coil arrangement plan of the armature winding per one phase having three-phase, four pole, three winding circuitries.
Figure 6:
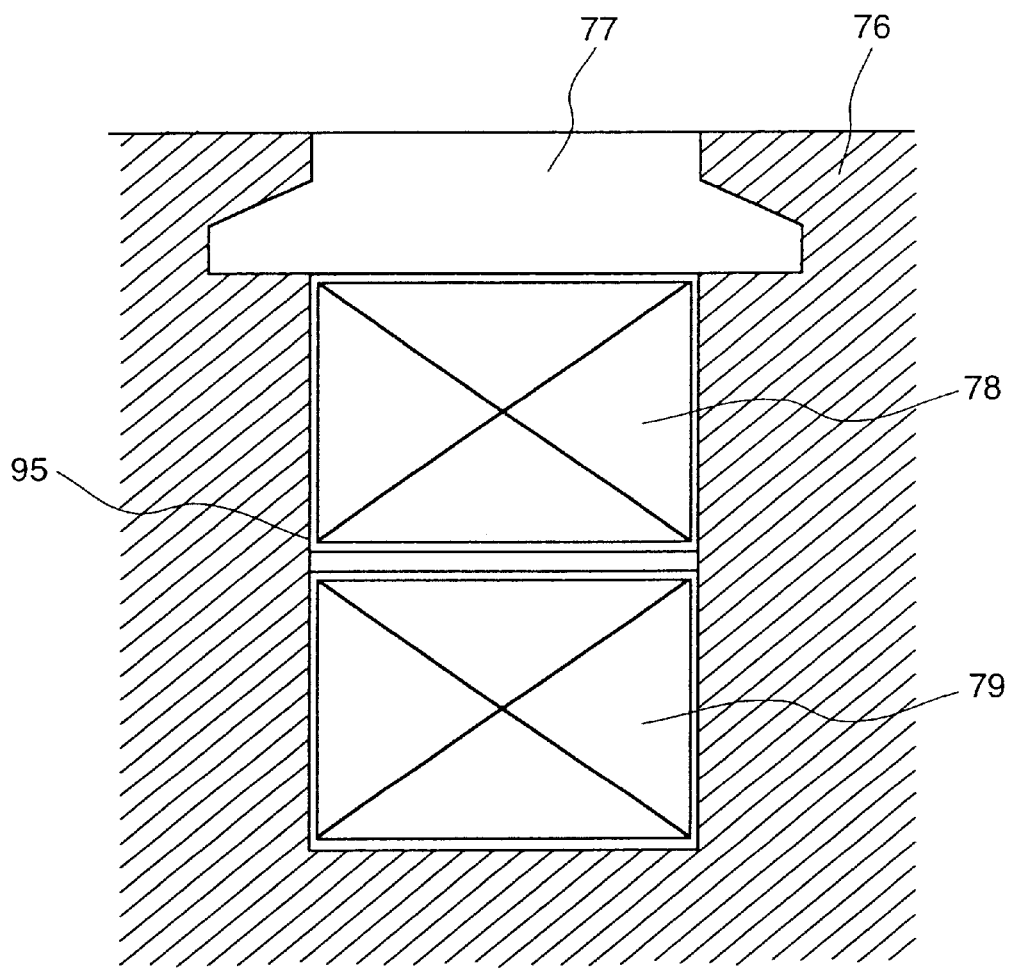
FIG. 6 is a stator slot cross section as one embodiment of the present invention.
Figure 7:
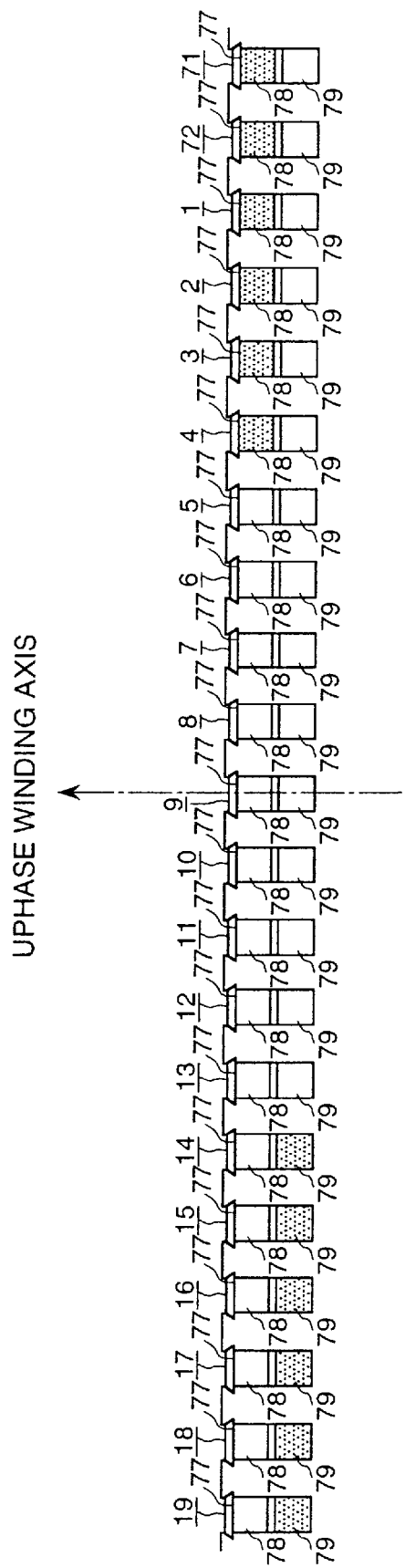
FIG. 7 is a coil arrangement plan per one phase and one pole of the armature winding as one embodiment of the present invention.

In FIG. 1, a coil arrangement of an armature winding of one phase is shown as one embodiment of the present invention, in FIG. 2, a contour construction of the turbine generator is shown, in FIGS. 3A, 3B, a conceptual diagram of a conventional four winding circuitry Y connection is shown, in FIGS. 4A, 4B, a conventional conceptual diagram of the four winding circuitry Y connection is shown, in FIG. 5, a coil arrangement of 72 slot, three winding circuitry as a reference example is shown, in FIG. 6, a stator slot cross section is shown, and in FIG. 7, a coil arrangement per one phase is shown about one pole thereof.

As shown in FIG. 2, the turbine generator is constituted with a rotor 73 and a stator 74, the rotor 74 is provided with a solid core, the stator core 76 is provided with multi-layer thin plates, plural slots are provided in an internal circumference side of the stator 73 in order to mount an armature winding 75. As mentioned above, in case of the turbine generator, the dipoles machine is used most of all in a thermal power generator, and the four pole machine is used in the atomic power generator a lot. Generally the armature winding of the turbine generator is Y connection, and the number of winding circuitry every each phase is provided with a divisor of the number of the poles. Because when the number of the winding circuitry of each phase is provided with the divisor of the number of the poles, it becomes possible to arrange the coil constituting each winding circuitry in electrically completely the same, thereby it becomes possible to let an induced voltage between each winding circuitry balanced. For example, in case of the four pole machine, the number of the winding circuitry can be 4, 2 or 1.

By the way, when the number of the winding circuitry every each phase is done with 3, the construction of the generator can be streamlined than that in four winding circuitry, and the number of the winding circuitry can be 3. The reason to be able to make construction of the generator more reasonable when the number of winding circuitry of each phase is 3, will be explained by using FIGS. 3A, 3B and FIGS. 4A, 4B.

When the winding circuitry number of the armature winding of the turbine generator 86 is 4 as shown in FIGS. 3A, 3B, respectively six, totally twelve lead-wires 89–94 are provided to both ends of a mover side (the turbine side) and an anti-mover side (the collector ring side), thereby, the bushing 88 and the terminal box 87 are arranged with the both sides, too.

On the other hand, when the three winding circuitries are provided to the winding of the each phase, the lead-wire 89–94 becomes to be six as shown in FIGS. 4A, 4B, the bushing 88 and the terminal box 87 become to be arranged on only one side of the turbine generator 86.

In this way, when the number of the winding circuitry of each phase is done with 3, it is effective for the reasonable construction of the generator extends and for the space security of the generator footing. However, as mentioned above, as the number of winding circuitry of armature winding is not a divisor of the pole number in a case of a four pole machine, an induced voltage of the three winding circuitry becomes to be unbalance, and a circulating current flows through the winding circuitry. Accordingly, when the number of the winding circuitry of each phase is done with 3 in the four pole machine, it is necessary for the voltage unbalance between the winding circuitries to become small.

Therefore, a coil arrangement is shown in FIG. 5 as a reference example to make the voltage unbalance between each winding circuitry small. FIG. 5 shows a case of stator slot number 72. In FIG. 5, numbers 1 to 72 in a square frame show slot numbers, and the number of 1 to 72 are provided from 1 to 72 in sequence and in a circumference direction as 2, 3, . . . , 5 3, 5 4, 1, 2, . . . .

In addition, shown in FIG. 6, a coil 78 (a top coil) and 79 (a bottom coil) of the armature winding which is provided in a two-layer construction are put in a slot 95 provided on the stator core 76, and is fixed with a wedge 77. The armature winding 78,79 become to be a two-layer construction, a coil arranged inside diameter (wedge 77) side of the stator is called as a top coil 78, and a coil arranged in an external side of the stator is called as a bottom coil 79.

Because it is desirable for the induced voltage waveform of the generator to be near to a sine-wave as long as possible, the armature winding is usually provided a short-pitch winding of a distributed winding.

The reason is because the fifth and the seventh higher harmonic wave becomes to be small when the ratio β of the pole pitch to the winding pitch=5/6. In a case of the 72 slot, as the pole pitch is (the number of slot)/(the number of pole)=72/4=18, the winding pitch τ becomes 15 (with FIG. 5, for example, τ=32−17=15). In case of three-phase, four pole, 72 slots, as the slot number Nspp of every pole every phase is (the slot number)/(the phase number×pole number)=72/(3×4)=6, pole P1 of one phase (for example, U phase) is constructed with a top coil of slots 71, 72, 1 to 4 and a bottom coil of slots 14 to 19, pole P2 is constructed with a top coil of slots 17 to 22 and a bottom coil of slots 32 to 37, pole P3 is constructed with a top coil of slots 35 to 40 and a bottom coil of slots 50 to 55, and pole P4 is constructed with a top coil of slots 53 to 58 and a bottom coil of slots 68 to 72.

Then, as shown in FIG. 7, a central axis of the top coil 78 of slots 71, 72, 1 to 4 and the bottom coil 79 of slots 14 to 19 is called as U phase winding axis of the pole P1.

(Relating to pole to two to four poles, it can be explained in the same way.)

On the other hand, as the number of the top coil 78 and the bottom coil 79 constituting the three winding circuitry of each phase, is (the number of the slot)/(the phase number× the winding circuitry number)=72/(3×3)=8, three winding circuitries 96 to 98 are each consisted with top coils of 788 and bottom coils of 798.

In FIG. 5, the four poles (P1, P2, P3, P4) are constituted by the three winding circuitries 96 to 98 as follows.

Pole P1: said winding circuitry 96 provided with six (all) top coils and bottom coils, Pole P2: said winding circuitry 97 provided with six (all) top coils and bottom coils, Pole P3: said winding circuitry 97 provided with top coils of slot 37 and slot 39 and bottom coils of slots 51 and slot 53, and said winding circuitry 98 provided with other four top coils and bottom coils, and Pole P4: said winding circuitry 96 provided with top coils of slot 55 and slot 57, bottom coils of slot 69 and slot 71, and winding circuitry 98 provided with other four top coils and bottom coils.

Here, in a four poles machine having 72 slots, electrical angle of 1 slot pitch is 360° /(slot number/pole logarithm)=360° /(72/2)=10°

For example, an induced voltage of coil of the slot 1 is obtained as a standard as follows, $\dot{V}_1 = V_1 \angle 0°$ An induced voltage of the coil of the slot 2 becomes as follows, $\dot{V}_2 = V_1 \angle -10°$ An induced voltage of the coil of the slot 3 becomes as follows, $\dot{V}_3 = V_1 \angle -20°$ An induced voltage of the coil of slot n becomes as follows, $\dot{V}_n = V_1 \angle -\{(n-1) \times 10\}°$ The induced voltage of the three winding circuitries 96 to 98 is given by a vector sum of an induced voltage of a top coil constituting each winding circuitry and the bottom coil, and the induced voltage of the coil of the slot 1 is turned into a standard as follows, $\dot{V}_1 = V_1 \angle 0°$ In FIG. 5, the induced voltage V 96 of the winding circuitry 96, is given by a sum of the induced voltage of the top coil of the slots 71, 72, 1 to 4, 55, 57 and the bottom coil of the slots 14 to 19, 69, 71. That is to say, it becomes as follows, $\dot{V}_{96} = \dot{V}_{71} + \dot{V}_{72} + \dot{V}_1 + \dot{V}_2 + \dot{V}_3 + \dot{V}_4 - \dot{V}_{14} - \dot{V}_{15} - \dot{V}_{16} -$
$\dot{V}_{17} - \dot{V}_{18} - \dot{V}_{19} - \dot{V}_{55} - \dot{V}_{57} + \dot{V}_{69} + \dot{V}_{71}$
$14.784 V_1 \angle 10°$ When calculating in the same way, an induced voltage of the winding circuitry 97 is as follows, $\dot{V}_{97} = 14.784 V_1 \angle 10°$ An induced voltage of the winding circuitry 98 becomes as follows, $V_{98} = 14.762 V_1 \angle 10°$ That is to say, the induced voltages of the winding circuitries 96 and 97 are equal, and the induced voltage of the winding circuitry 98 becomes smaller than the induced voltage of the winding circuitries 96 and 97, however the voltage unbalance is around 0.15%, and it can be negligibly small.

However, as the coil arrangement shown in FIG. 5 is limited to 72 slot, it is necessary for the coil to arrange it so as to be suitable in the number of the slot when the number of the stator slot is different.

As mentioned above, in late years, single capacity of the generator is in an increasing trend, the product of the voltage and the current of the generator should be increased because the power factor is almost same when the capacity of the generator is made big. However, by a withstand voltage of the insulation to be used for the coil of the armature winding, the terminal voltage of the generator is limited. In such a case, the terminal voltage is held down by reducing the number of the stator slot and by making the armature current bigger.

That is to say, in order to make the capacity of the generator bigger, it is desirable to reduce the number of the stator slot than 72, a coil arrangement having a connection not complicated should be found with a level that the voltage unbalance is not a problem.

Figure 8:
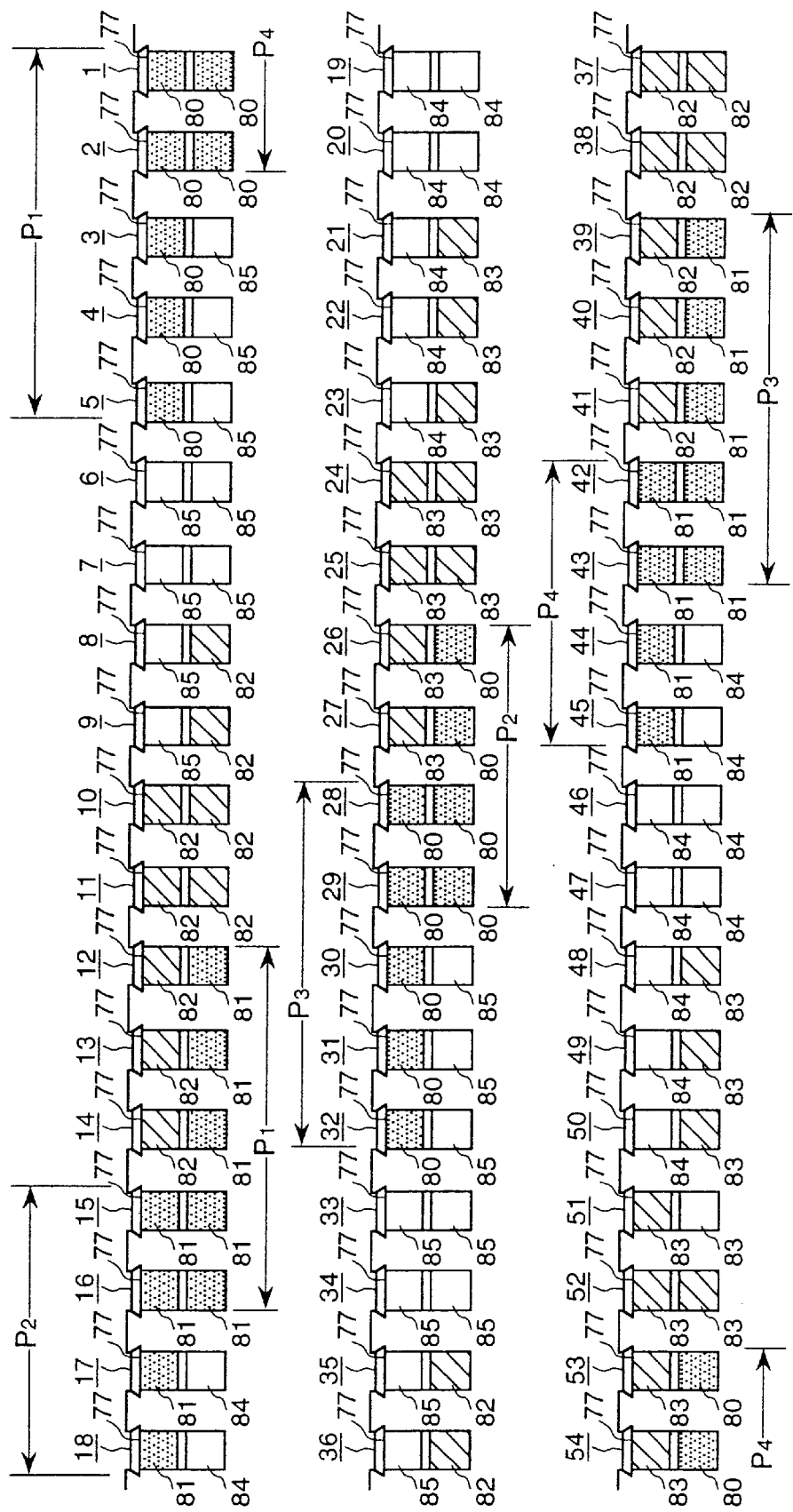
FIG. 8 is a coil arrangement view of the armature winding of a three-phase, four pole rotating electric machine,as one embodiment of the present invention.

An armature winding connection diagram in 54 slot is shown in FIG. 1 as one embodiment of the present invention, and an arrangement of each phase coil of 54 slots, three-phase winding is shown in FIG. 8. FIG. 1 illustrates a one phase minute (for example, U phase), Other two-phase (V phase and W phase) can be obtained by arranging a connection shown in FIG. 1 by separating mutually spatially with an electrical angle of 120°. Numbers 1 to 54 show slot numbers here, and numbers 1 to 72 in a square frame show slot numbers, and are arranged from 1 in sequence and in a circumference direction as 2, 3, . . . , 53, 54, 1, 2, . . . .

In a rotating electric machine of three-phase, four poles, 54 slot number, FIG. 8 shows an arrangement of the coil of each phase of the armature winding, and a ratio β of a pole pitch to a winding pitch=11/13.5=0.815. As stated above, it is desirable for the induced voltage ripple of the generator to be near to a sine-wave as possible, and the ratio β of the pole pitch to the winding pitch can be 5/6=0.833.

However in a case of the stator slot number 54 and four pole machine, a pole pitch is (number of the stator slot)/(number of the pole)=54/4=13.5, therefore, β=11/13.5=0.815, when the winding pitch is 11 and β=12/13.5=0.889, when the winding pitch is 12, therefore, βcan not be=5/6=0.833. Therefore it was done with β=0.815 in FIG. 8.

As shown in FIG. 8, in a case of the three-phase circuit, four poles, 54 slots, a number Nspp of every pole every phase is (the number of the slot)/(the number of phase×the number of the pole)=54/(3×4)=4.5. Therefore, when a rotational direction of the rotator is towards the slot 1, 2, . . . , 53, 54, 1, . . . , and the five top coils of slots 1 to 5 provides a U phase coil 80, four top coils of the slots 6 to 9 provide a W phase coil 85, five top coils of slots 10 to 14 provide a V phase coil 82, four top coils of slots 15–18 provide a U phase coil 81, five top coils of slots 19–23 provide a W phase coil 84, four top coils of slots 24 to 27 provide a V phase coil 83, five top coils of slots 28 to 32 provide a U phase coil 80, four top coils of slots 33 to 36 provide a W phase coil 85, five top coils of slots 37 to 41 provide a V phase coil 82, four top coils of slots 42 to 45 provide a U phase coil 81, five top coils of slots 46 to 50 provide a W phase coil 84, and four top coils of slots 51 to 54 provide a V phase coil 83.

On the other hand, as the winding pitch of the bottom coil is 11, five bottom coils of slots 12 to 16 provide a U phase coil 81, four bottom coils of slots 17 to 20 provide a W phase coil 84, five bottom coils of slots 21 to 25 provide a V phase coil 83, four bottom coils of slots 26 to 29 provide a U phase coil 80, five bottom coils of slots 30 to 34 provide a W phase coil 85, four bottom coils of slots 35 to 38 provide a V phase coil 82, five bottom coils of slots 39 to 43 provide a U phase coil 81, four bottom coils of slots 44 to 47 provide a W phase coil 84, five bottom coils of slot 48 to 52 provide a V phase coil 83, four bottom coils of slots 53, 54, 1, 2 provide a U phase coil 80, five bottom coils of slots 3 to 7 provide a phase coil 85, and four bottom coils of slots 8 to 11 provide a V phase coil 82.

As mentioned above in the U phase, one pole of P1 is constituted with top coils of slots 1 to 5 and bottom coils of slots 12–16, one pole of P2 is constituted with top coils of slots 15 to 18 and bottom coils of slots 26 to 29, one pole of P3 is constituted with top coils of slots 28 to 32 and bottom coils of slots 39 to 43, and one pole of P4 is constituted with top coils of slots 42 to 45 and bottom coils of slots 53, 54, 1, 2.

In addition, as the pole P4 and the pole P3, and the pole P2 and the pole P4 respectively has a same polarity, and the pole P1 and the pole P2 has a different polarity, when a direction of a current to flow in top coils of the slot 1 to 5 is defined to be positive, the current to flow in the bottom coils of the slots 12 to 16 flows into a reverse direction with the current to flow in top coils of the slots 1 to 5 so as to be negative, similarly, the current of the top coils of the slots 15 the 18 becomes to be negative, the current of the bottom coils of the slots 26 to 29 becomes to be positive, the current of the top coils of slots 28 to 32 becomes to be positive, the current of the bottom coils of slots 39 to 43 becomes to be negative, the current of the top coils of slots 42 to 45 becomes to be negative, and the current of the bottom coils of the slots 53,54,1,2 becomes to be positive. In FIG. 8, the coil which the current of a positive direction flows in U phase is a coil 80, and the coil which a negative current flows through is a coil 81. (Similarly, the coil which the positive current flows in V phase is a coil 82, and the coil which a negative current flows through is a coil 83, and the coil which the positive current flows in W phase is a coil 84, and the coil which a negative current flows through is a coil 85.)

On the other hand, in a case of 54 slot, three-phase, and three winding circuitries per one phase of, a number Nspc per every one winding circuit is (the number of the slot)/(the number of phase×the number of the winding circuit)=54/(3×3)=6.

The one winding circuitry is constituted by 6 of the top coils and 6 of the bottom coils, and all winding circuitries are provided across the poles equal to or more than 2. When one winding circuitry is provided across many poles, number of the lines to across increases further. On this account, the winding circuitry to across the poles equal to or more than 3 should be avoided so that edge construction do not become complicated.

In a U phase coil 80, 81 of FIG. 8, FIG. 1 shows an arrangement of three winding circuitries 96 to 98. Pole center of pole P1, pole P2, pole P3, pole P4 are shown typically. In a right side of pole P1, pole P2, pole P3, pole P4 surrounded with a circle, an arrangement about the top coil 78 is shown, and an arrangement of the bottom coil 79 is shown in a left side thereof. In FIG. 1, the winding circuitry 96 is constituted with top coils of slots 1 to 5 and 16, and bottom coils of slots 12 to 16 and 28, the winding circuitry 97 is constituted with top coils of slots 28 to 32 and 43 an bottom coils of slots 39 to 43 and 1, and winding circuitry 98 constituted with top coils of slots 15, 17, 18, 42, 44, 45 and bottom coils of slots 26, 27, 29, 53, 54, 2. That is to say, the four poles (P1, P2,P3, P4) are constituted with the winding circuitries 96 to 98 as follows.

Pole P1: winding circuitry 96 having five (all) top coils and bottom coils,

Pole P2: winding circuitry 96 having a top coil and a bottom coil located thirdly from a winding axis of said pole P2, and winding circuitry 98 having other three top coils and bottom coils, Pole P3: winding circuitry 97 having five (all) top coils and bottom coils, and Pole P4: winding circuitry 97 having a top coil and a bottom coil located thirdly from a winding axis of said pole P4, and winding circuitry 98 having other three top coils and bottom coils.

Therefore, the winding circuitries 96 to 98 are provided across the two poles, and the arrangement of the winding circuitries 96 is completely electrically same as that of the winding circuitry 97, and only the winding circuitry 98 is different arrangement from other two.

As the winding circuitries 96 to 98 are connected in parallel, it is desirable that every induced voltages of winding circuitries 96 to 98 are in balance if possible. Here, an induced voltage of the winding circuitries 96 to 98 will be calculated. In a four pole machine having 54 slots, an electrical angle of one slot pitch becomes as follows.

360°/(number of slot/pole logarithmic)=360°/(54/2)=13.33°

When an induced voltage of the coil of the slot 1 is provided as a standard as follows.

$$\dot{V}_1 = V_1 \angle 0°$$

An induced voltage of the coil of the slot 2 becomes as follows.

$$\dot{V}_2 = V_1 \angle -13.33°$$

An induced voltage of the coil of the slot 3 becomes as follows.

$$\dot{V}_3 = V_1 \angle -26.67°$$

An induced voltage of the coil of the slot n becomes as follows.

$$\dot{V}_{n-V1} \angle -\{(n-1) \times 13.33\}°$$

Therefore, an induced voltage V96 of the winding circuitry 96 becomes as follows.

$$\dot{V}_{96} = \dot{V}_1 + \dot{V}_2 + \dot{V}_3 + \dot{V}_4 + \dot{V}_5 - \dot{V}_{12} - \dot{V}_{13} - \dot{V}_{14} - \dot{V}_{15} - \dot{V}_{16} - \dot{V}_{16} + \dot{V}_{28} = 11.039 V_1 \angle -10°$$

An induced voltage V97 of the winding circuitry 97 becomes as follows.

$$\dot{V}_{97} = \dot{V}_{28} + \dot{V}_{29} + \dot{V}_{30} + \dot{V}_{31} + \dot{V}_{32} - \dot{V}_{39} - \dot{V}_{40} - \dot{V}_{41} - \dot{V}_{42} - \dot{V}_{43} - \dot{V}_{43} + \dot{V}_1 = 11.039 V_1 \angle -10°$$

An induced voltage V98 of the winding circuitry 98 becomes as follows.

$$\dot{V}_{98} = -\dot{V}_{15} - \dot{V}_{17} - \dot{V}_{18} + \dot{V}_{26} + \dot{V}_{27} + \dot{V}_{29} - \dot{V}_{42} - \dot{V}_{44} - \dot{V}_{45} + \dot{V}_{53} + \dot{V}_{54} + \dot{V}_2 = 10.875 V_1 \angle -10°$$

The induced voltages of the winding circuitries 96 and 97 are equal each other, and the induced voltage of the winding circuitry 98 becomes smaller only 0.164V1 than those of the winding circuitries 96 and 97.

Accordingly when the coils are arranged as shown in FIG. 1, all of the winding circuitries are arranged across the poles equal to or more than 3, and number of the line arranged across can be minimum. In addition, as the phases of the induced voltages of three winding circuitries are equal and two of the three winding circuitries are completely electrically arranged in the same way, they can be produced easily, and the voltage unbalance between the winding circuitries can be very small as 0.164/11.039×100=1.49%.

Figure 9:
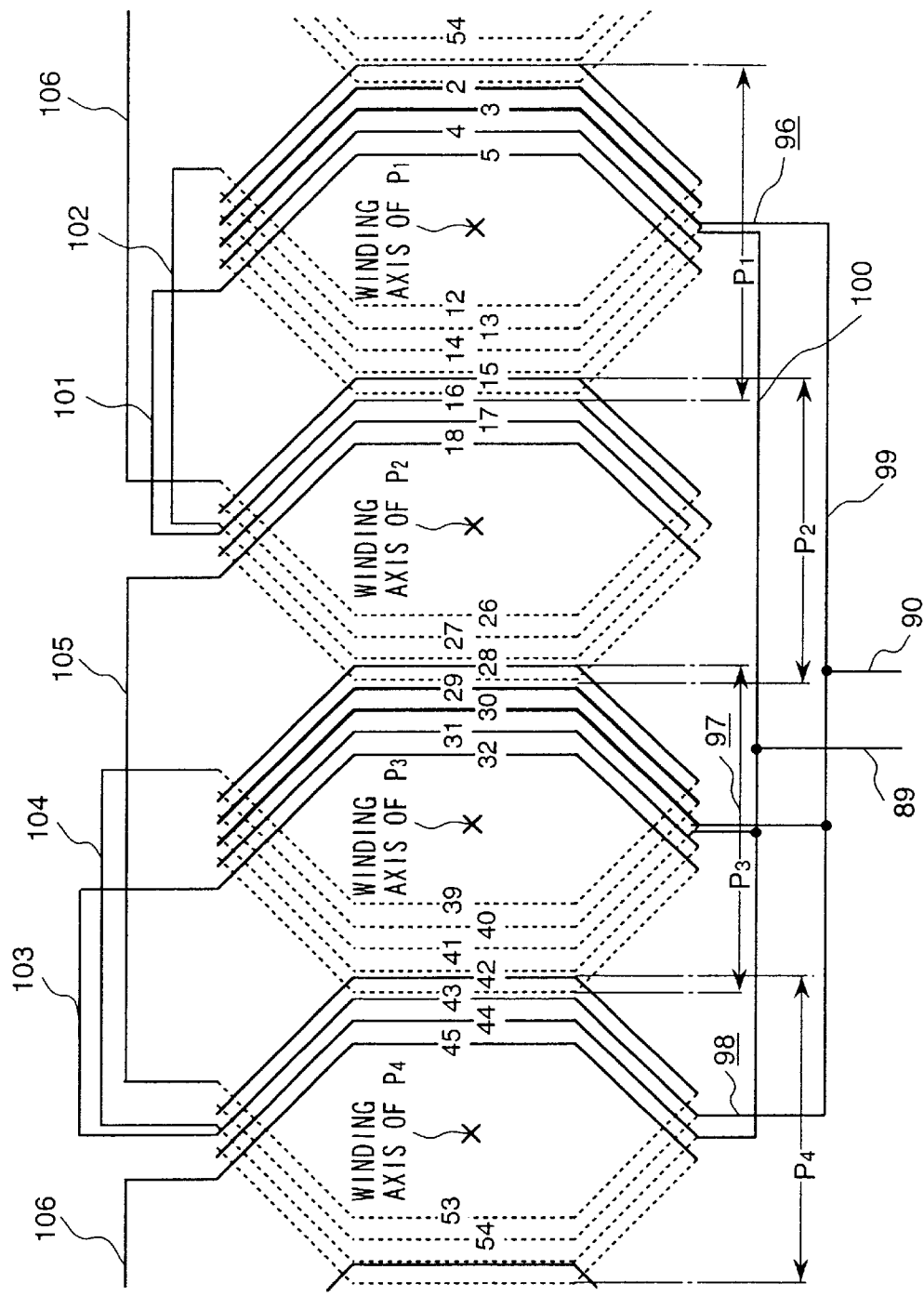
FIG. 9 is a connection diagram which shows one embodiment of the present invention.

One example of a connection diagram on the basis of the coil arrangement of FIG. 1 is shown in FIG. 9. In FIG. 9, when a lead-wire 90 is arranged in the neutral point side, a lead-wire 89 becomes to be arranged to the output terminal side. Accordingly, the winding circuitry 96 is arranged from the line 99 in a sequence of the top coil of the slot 3 (shown by a solid line in the figure, and herein after shown similarly), the bottom coil of the slot 15 (shown by a broken line in the figure, and herein after shown similarly), the top coil of the slot 4, the bottom coil of the slot 16, the top coil of the slot 5, the line 101, the top coil of the slot 16, the bottom coil of the slot 28, the line 102, the bottom coil of the slot 12, the top coil of the slot 1, the bottom coil of the slot 13, the top coil of the slot 2, the bottom coil of the slot 14, and the line 100.

On the other hand, the winding circuitry 97 is arranged from the line 99 in a sequence of the top coil of the slot 30, the bottom coil of the slot 42, the top coil of the slot 31, the bottom coil of the slot 43, the top coil of the slot 32, the line 103, the top coil of the slot 43, the bottom coil of the slot 1, the line 104, the bottom coil of the slot 39, the top coil of the slot 28, the bottom coil of the slot 40, the top coil of the slot 29, the bottom coil of the slot 41, and the line 100.

The winding circuitry 98 is arranged from the line 99 in a sequence of the bottom coil of the slot 54, the top coil of the slot 42, the bottom coil of the slot 53, the line 105, the top coil of the slot 18, the bottom coil of the slot 29, the top coil of the slot 17, the bottom coil of the slot 27, the top coil of the slot 15, the bottom coil of the slot 26, the line 106, the top coil of the slot 45, the bottom coil of the slot 2, the top coil of the slot 44, and the line 100.

When connected in this way, in a side of the lines 101 to 106, all the pitch to connect the top coil and the bottom coil becomes to be 12 (for example, the top coil of the slot 1 and the bottom coil of the slot 13), and in a side of the lead-wire 89, 90 except a specified point, the pitch to connect the top coil and the bottom coil becomes to be 11 (for example, the top coil of the slot 1 and the bottom coil of the slot 12). A point to be connected to with a specified pitch is totally 3 places (nine places in the three-phase circuit) of the top coil of the slot 16 and the bottom coil of the slot 28, the top coil of the slot 43 and the bottom coil of the slot 1, and the top coil of the slot 17 and the bottom coil of the slot 27.

The connection method based on a coil arrangement shown in FIG. 1 is not limited only to FIG. 9. However, in order to connect the bottom coil to the top coil with a constant pitch as long as possible, it is desirable to make the winding pitch of the standard "11" in the lead-wire side and to make the winding pitch of the standard "12" in an opposite side of the lead-wire side as shown in FIG. 9.

In the coil arrangement of FIG. 1, all three winding circuitries are arranged across the two poles and two of the three winding circuitries are electrically completely arranged in the same way. In such a case, the voltage unbalance becomes minimum in a coil arrangement of FIG. 1, and if three winding circuitries can be provided with an electrically different arrangement, the voltage unbalance becomes possible to be smaller than a case of FIG. 1.

Figure 10:
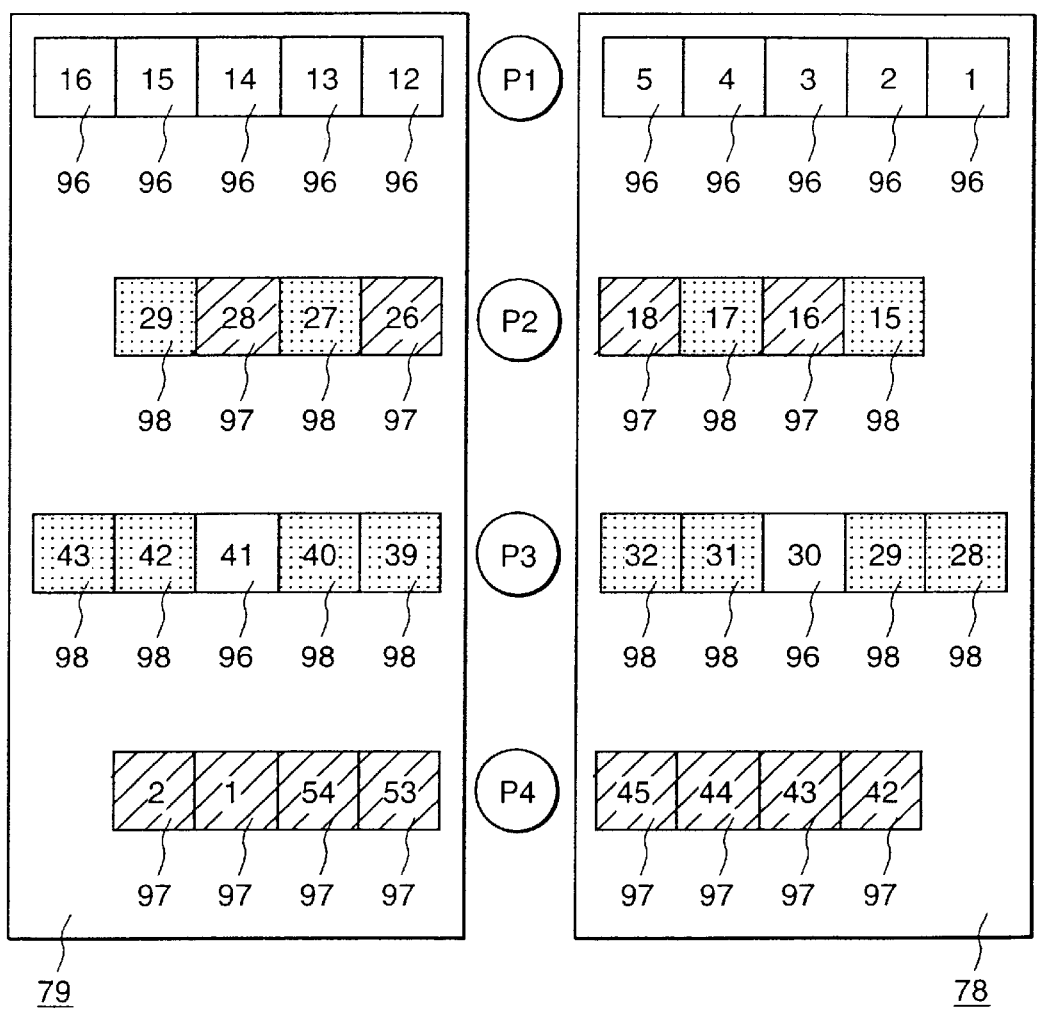
FIG. 10 is a coil arrangement view of the armature winding per one phase of the rotating electric machine showing one embodiment of the present invention.

A coil arrangement of the three winding circuitries as an other embodiment of the present invention will be shown in FIG. 10, in the same way as FIG. 1 relating to one phase. In FIG. 10, the winding circuitries 96 to 98 are arranged in an electrically different way, and the coils constituting the winding circuitries 96 to 98 are arranged across two poles. The winding circuitry 96 is constituted with the top coils of the slots 1 to 5 and 30 and the bottom coils of the slots 12 to 16 and 41, the winding circuitry 97 is constituted with the top coils of the slots 16, 18, 42 to 45 and the bottom coils of the slots 26, 28, 53, 54, 1, 2, and the winding circuitry 98 is constituted with the top coils of the slots 15, 17, 28, 29, 31 and 30 and the bottom coils of the slots 27, 29, 39, 40, 42 and 43. That is to say, four poles (P1, P2, P3, P4) are constituted with the winding circuitries 96 to 98 as follows.

Pole P1: winding circuitry 96 having five (all) top coils and bottom coils,

Pole P2: winding circuitry 97 having a top coil and a bottom coil located firstly and thirdly from a winding axis of said pole P2, and winding circuitry 98 having a top coil and a bottom coil located secondly and fourthly from said winding axis, Pole P3: winding circuitry 97 having a top coil and a bottom coil located thirdly from a winding axis of said pole P3 and winding circuitry 97 having other coils, and Pole P4: winding circuitry 97 having five (all) top coils and bottom coils.

When such a coil arrangement is provided, the induced voltage V96 of the winding circuitry 96 becomes as follows.

$$\dot{V}_{96}=\dot{V}_1+\dot{V}_2+\dot{V}_3+\dot{V}_4+\dot{V}_5-\dot{V}_{12}-\dot{V}_{13}-\dot{V}_{14}-\dot{V}_{15}-\dot{V}_{16}+\dot{V}_{30}-\dot{V}_{41}=10.985V_1\angle-10°,$$

The induced voltage V97 of the winding circuitry 97 becomes as follows.

$$\dot{V}_{97}=-\dot{V}_{16}-\dot{V}_{18}+\dot{V}_{26}+\dot{V}_{28}-\dot{V}_{42}-\dot{V}_{43}-\dot{V}_{44}-\dot{V}_{45}+\dot{V}_{53}+\dot{V}_{54}+\dot{V}_1+\dot{V}_2=10.981V_1\angle-°,$$

The induced voltage V98 of the winding circuitry 98 becomes as follows.

$$\dot{V}_{98}=-\dot{V}_{15}-\dot{V}_{17}+\dot{V}_{27}+\dot{V}_{29}+\dot{V}_{28}+\dot{V}_{29}+\dot{V}_{31}+\dot{V}_{32}-\dot{V}_{39}-\dot{V}_{40}-\dot{V}_{42}-\dot{V}_{43}=10.986V_1\angle-10°,$$

Therefore, the voltage unbalance between winding circuitry becomes at most as follows.

(10.986 to 10.981)/10.986×100=0.05%

Accordingly when the coil is arranged as FIG. 10, as the all winding circuitries are not arranged across the poles equal to or more than 3, number of the line can be the fewest. In addition, phases of the induced voltages of three winding circuitries are the same, and the voltage unbalance between the winding circuitries can be small as 0.05% so as to be able to be ignored. Further, this voltage unbalance becomes minimum in an armature winding of 54 slots, four poles and three winding circuitries per each phase, wherein said three winding circuitries are not arranged across the poles equal to or more than 3 and β=0.815.

Figure 11:
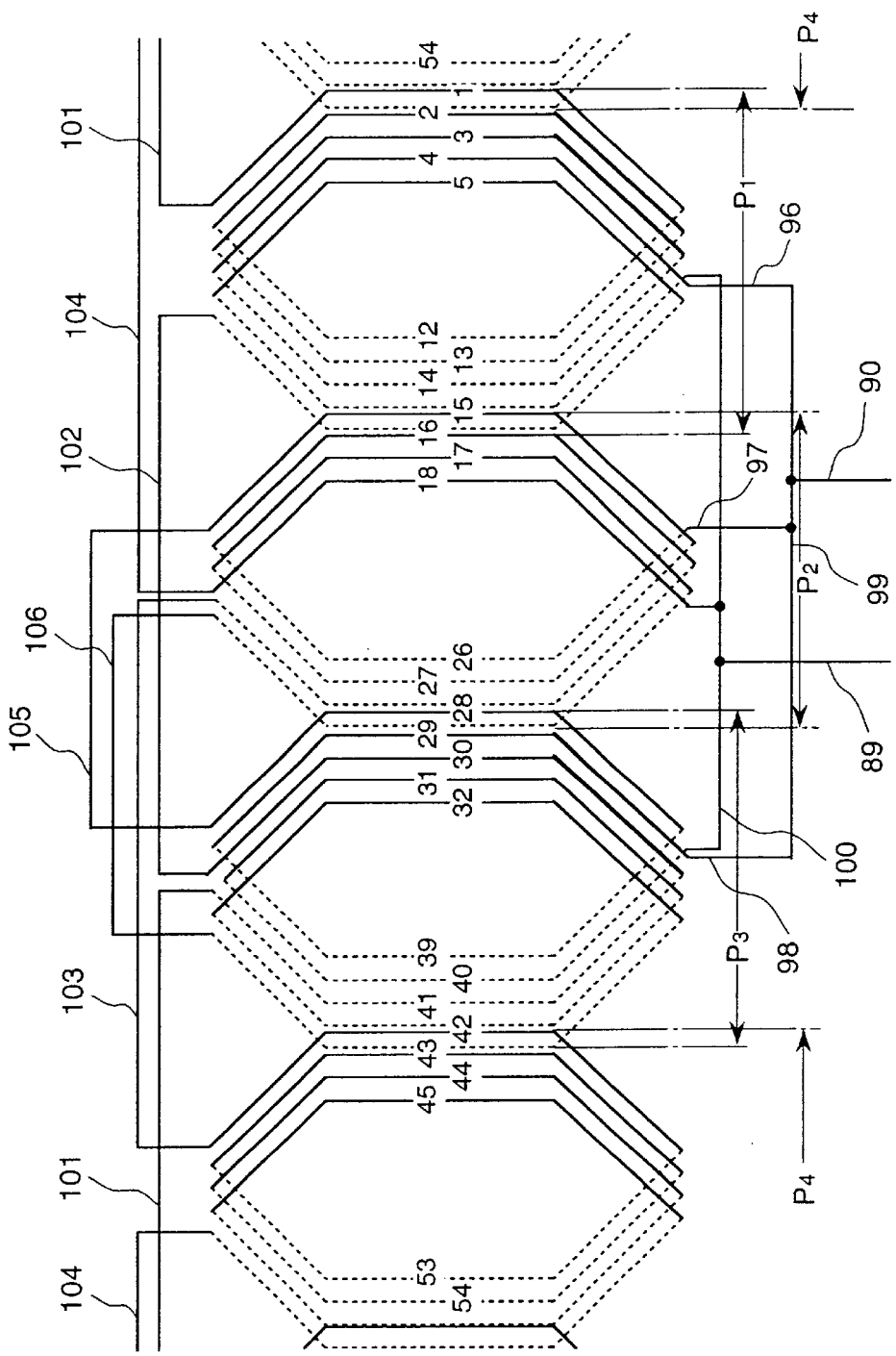
FIG. 11 is a connection diagram which shows one embodiment (of the present invention.

FIG. 11 is one example of the connection diagram on the basis of the coil arrangement shown in FIG. 10 In FIG. 11, when the lead-wire 90 is arranged in the neutral point side, the lead-wire 89 becomes to be arranged to the output terminal side. Accordingly, the winding circuitry 96 is arranged from the line 99 in a sequence of the top coil of the slot 4, the bottom coil of the slot 14, the top coil of the slot 3, the bottom coil of the slot 13, the top coil of the slot 2, the bottom coil of the slot 12, the top coil of the slot 1, the line 101, the bottom coil of the slot 41, the top coil of the slot 30, the line 102, the bottom coil f the slot 16, the top coil of the slot 5, the bottom coil of the slot 15, and the line 100.

The winding circuitry 97 is arranged from the line 99 in a sequence of the bottom coil of the slot 26, the top coil of the slot 16, the bottom coil of the slot 28, the line 103, the top coil of the slot 42, the bottom coil of the slot 53, the top coil of the slot 43, the bottom coil of the slot 54, the top coil of the slot 44,the bottom coil of the slot 1, the top coil of the slot 45, the bottom coil of the slot 2, the line 104, the top coil of the slot 18, and the line 100.

The winding circuitry 98 is arranged from the line 99 in a sequence of the top coil of the slot 29, the bottom coil of the slot 39, the top coil of the slot 28, the line 105, the top coil of the slot 15, the bottom coil of the slot 27, the top coil of the slot 17, the bottom coil of the slot 29, the line 106, the bottom coil of the slot 43, the top coil of the slot 32, the bottom coil of the slot 42, the top coil of the slot 31, the bottom coil of the slot 40, and the line 100.

When connected in this way, in a side of the lines 101 to 106, the pitch to connect the top coil and the bottom coil becomes to be 10 except a specified point, (for example, the top coil of the slot 2 and the bottom coil of the slot 12), and in a side of the lead-wire 89, 90, the pitch to connect the top coil and the bottom coil becomes to be 11 except a specified point, (for example, the top coil of the slot 1 and the bottom coil of the slot 12). A point to be connected to with a specified pitch is totally 4 places (twelve places in the three-phase circuit) of the bottom coil of the slot 40 and the top coil of the slot 31 in a side of the lines 101 to 106, the top coil of the slot 15 and the bottom coil of the slot 27 in a side of the lead-wire 89, 90, the top coil of slot 16 and the bottom coil of slot 28, and the top coil of the slot 17 and the bottom coil of the slot 29.

FIG. 11 is one example of the connection diagram on the basis of the coil arrangement shown in FIG. 10. In order to make point to be connected with a specified pitch fewer as long as possible, it is desirable to make the winding pitch of the standard "11" in the lead-wire side and to make the winding pitch of the standard "12" in an opposite side of the lead-wire side as shown in FIG. 11.

Figure 12:
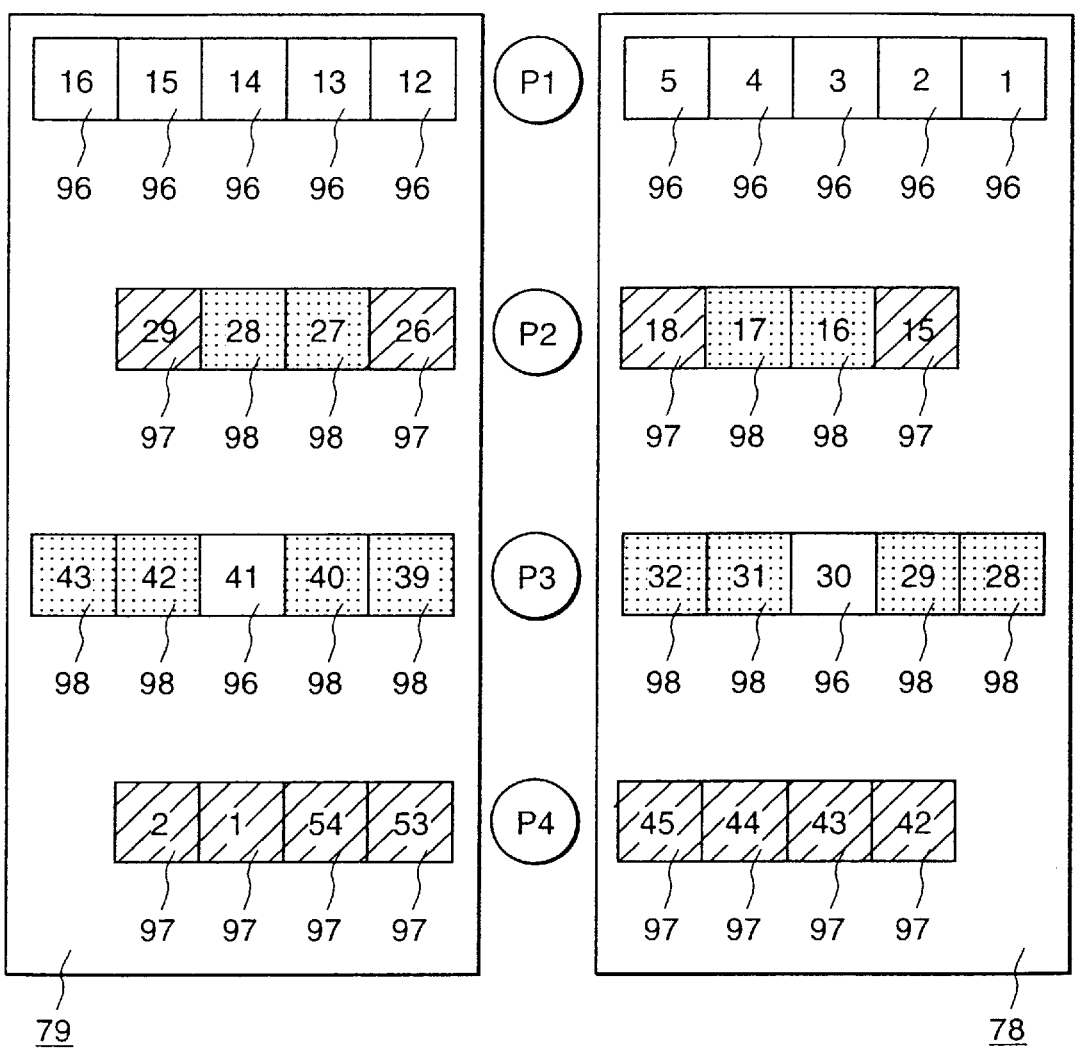
FIG. 12 is a coil arrangement view of the armature winding per one phase of the rotating electric machine showing one embodiment of the present invention.

A coil arrangement of the three winding circuitries as an other embodiment of the present invention will be shown in FIG. 12, in the same way as FIG. 1 relating to one phase. In FIG. 12 in the same way as FIG. 10, the winding circuitries 96 to 98 are arranged in an electrically different way, however, the coils which constitutes the winding circuitries 96 to 98 are not arranged across the poles equal to or more than 3. The winding circuitry 96 is constituted with the top coils of the slots 1 to 5 and 30 and the bottom coils of the slots 12 to 16 and 41, the winding circuitry 97 is constituted with the top coils of the slots 15, 18, 42 to 45 and the bottom coils of the slots 26, 29, 53, 54, 1, 2, and the winding circuitry 98 is constituted with the top coils of the slots 16, 17, 28, 29, 31 and 32 and the bottom coils of the slots 27, 28, 39, 40, 42 and 43. That is to say, four poles (P1, P2, P3, P4) are constituted with the winding circuitries 96 to 98 as follows.

Pole P1: winding circuitry 96 having five (all) top coils and bottom coils,

Pole P2: winding circuitry 97 having a top coil and a bottom coil located firstly and fourthly from a winding axis of said pole P2, and winding circuitry 98 having a top coil and a bottom coil located secondly and thirdly from said winding axis, Pole P3: winding circuitry 96 having a top coil and a bottom coil located thirdly from a winding axis of said pole P3 and winding circuitry 98 having other coils, and Pole P4: winding circuitry 97 having five (all) top coils and bottom coils.

When such a coil arrangement is provided, the induced voltage V96 of the winding circuitry 96 becomes as follows.

$$\dot{V}_{96}=\dot{V}_1+\dot{V}_2+\dot{V}_3+\dot{V}_4+\dot{V}_5-\dot{V}_{12}-\dot{V}_{13}-\dot{V}_{14}-\dot{V}_{15}-\dot{V}_{16}+\dot{V}_{30}-\dot{V}_{41}+10.985V_1\angle-°,$$

The induced voltage V97 of the winding circuitry 97 becomes as follows.

$$\dot{V}_{97}=-\dot{V}_{15}-\dot{V}_{18}+\dot{V}_{26}+v_{29}-\dot{V}_{42}-\dot{V}_{43}-\dot{V}_{44}-\dot{V}_{45}+\dot{V}_{53}+\dot{V}_{54}+\dot{V}_1+\dot{V}_2=11.008V_1\angle-10°,$$

The induced voltage V98 of the winding circuitry 98 becomes as follows.

$$\dot{V}_{98}=-\dot{V}_{16}-\dot{V}_{17}+\dot{V}_{27}+\dot{V}_{28}+\dot{V}_{28}+\dot{V}_{29}+\dot{V}_{31}+\dot{V}_{32}-\dot{V}_{39}-\dot{V}_{40}-\dot{V}_{42}-\dot{V}_{43}=10.959V_1\angle-10°$$

Therefore, the voltage unbalance between winding circuitry becomes at most as follows.

(11.008 to 10.959)/11.008×100=0.45%

Accordingly when the coil is arranged as FIG. 12, as the all winding circuitries are not arranged across the poles equal to or more than 3, number of the line can be the fewest in the same way as FIGS. 1 and 10. In addition, phases of the induced voltages of three winding circuitries are the same, and the voltage unbalance between the winding circuitries can be small as 0.45%.

Figure 13:
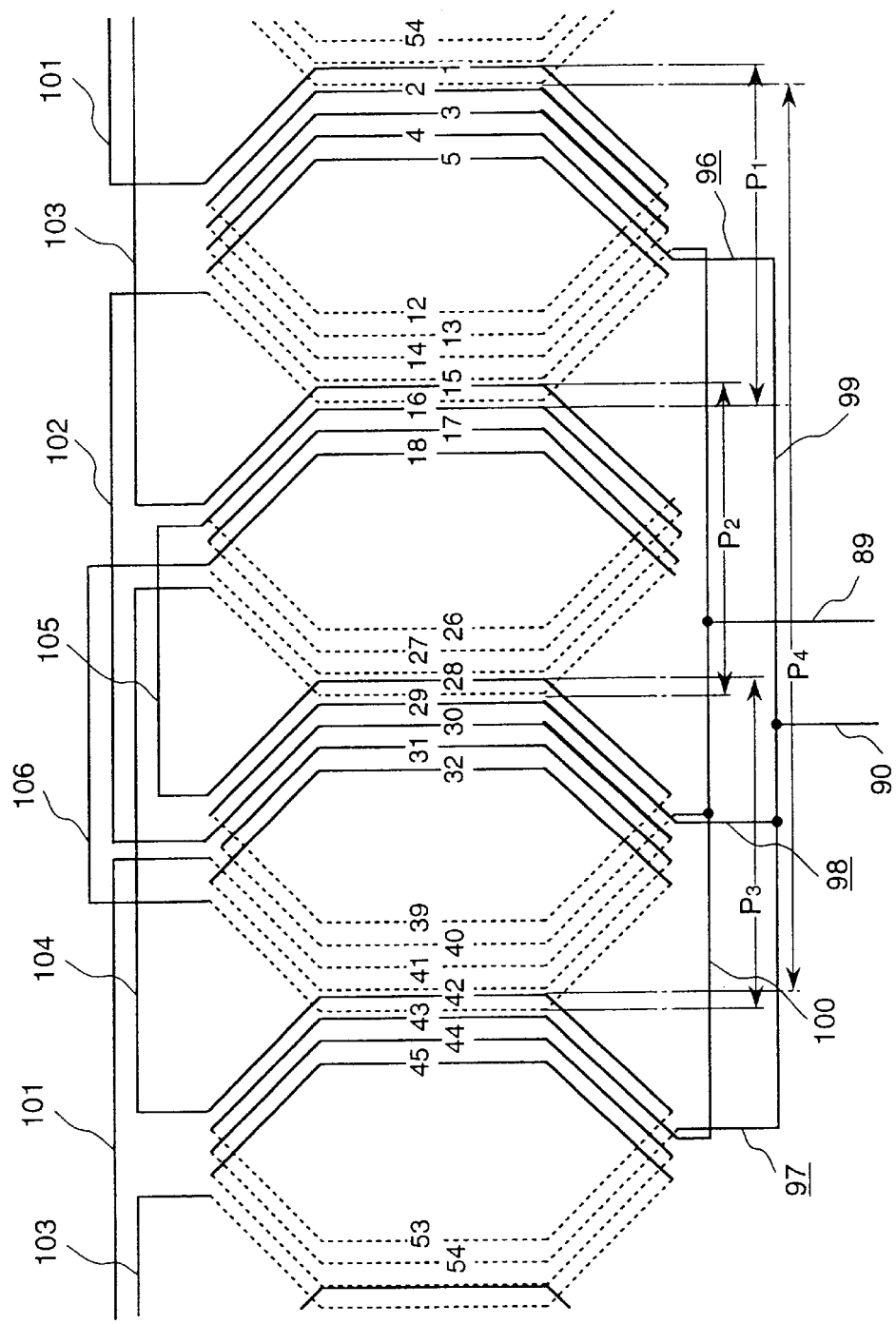
FIG. 13 is a connection diagram which shows one embodiment of the present invention.

FIG. 13 is one example of the connection diagram on the basis of the coil arrangement shown in FIG. 12. In FIG. 13, when the lead-wire 90 is arranged in the neutral point side, the lead-wire 89 becomes to be arranged to the output terminal side. Accordingly, the winding circuitry 96 is arranged from the line 99 in a sequence of the top coil of the slot 4, the bottom coil of the slot 14, the top coil of the slot 3, the bottom coil of the slot 13, the top coil of the slot 2, the bottom coil of the slot 12, the top coil of the slot 1, the line 101, the bottom coil of the slot 41, the top coil of the slot 30, the line 102, the bottom coil of the slot 16, the top coil of the slot 5, the bottom coil of the slot 15, and the line 100.

The winding circuitry 97 is arranged from the line 99 in a sequence of the bottom coil of the slot 54, the top coil of the slot 44, the bottom coil of the slot 1, the top coil of the slot 45, the bottom coil of the slot 2, the line 103, the top coil of the slot 15, the bottom coil of the slot 26, the top coil of the slot 18, the bottom coil of the slot 29, the line 104, the top coil of the slot 42, the bottom coil of the slot 53, the top coil of the slot 43, and the line 100.

The winding circuitry 98 is arranged from the line 99 in a sequence of the top coil of the slot 29, the bottom coil of the slot 39, the top coil of the slot 28, the line 105, the top coil of the slot 16, the bottom coil of the 1slot 27, the top coil of the slot 17, the bottom coil of the slot 29, the line 106, the bottom coil of the slot 43, the top coil of the slot 32, the bottom coil of the slot 42, the top coil of the slot 31, the bottom coil of the slot 40, and the line 100.

When connected in this way, in a side of the lines 101 to 106, the pitch to connect the top coil and the bottom coil becomes to be 10 except a specified point, (for example, the top coil of the slot 2 and the bottom coil of the slot 12), and in a side of the lead-wire 89, 90, all the pitch to connect the top coil and the bottom coil becomes to be 11 except a specified point, (for example, the top coil of the slot 1 and the bottom coil of the slot 12). A point to be connected to with a specified pitch is totally two places (six places in the three-phase circuit) of the top coil of the slot 18 and the bottom coil of the slot 26, and the top coil of the slot 31 and the bottom coil of the slot 40.

That is to say, in a coil arrangement shown in FIG. 12, the voltage unbalance of 3 winding circuitries (unbalance 0.45%) becomes to be greater than that in a coil arrangement shown in FIG. 10 (unbalance 0.05%), however there is an advantage as that number of the points to be connected to with a specified pitch becomes ½.

Here, FIG. 13 is one example of the connection diagram on the basis of the coil arrangement shown in FIG. 12.

In order to make point to be connected with a specified pitch fewer as long as possible, it is desirable to make the winding pitch of the standard "11" in the lead-wire side and to make the winding pitch of the standard "10" in an opposite side of the lead-wire side as shown in FIG. 13.

In FIG. 1 and FIGS. 7 to 13, it is explained as that pole P1 is constituted with top coils of slots 1 to 5 and bottom coils of slots 12 to 16, pole P2 is constituted with top coils of slots 15 to 18 and bottom coils of slots 26 to 29, pole P3 is constituted with top coils of slots 28 to 32 and bottom coils of slots 39 to 43, and pole P4 is constituted with top coils of slots 42 to 45 and bottom coils of slots 53, 54, 1, 2.

However, pole P1 may be constituted with bottom coils of slots 1 to 5 and top coils of slots 12 to 16, pole P2 may be constituted with bottom coils of slots 15 to 18 and top coils of slots 26 to 29, pole P3 may be constituted with bottom coils of slots 28 to 32 and top coils of slots 39 to 43, and pole P4 may be constituted with bottom coils of slots 42 to 45 and top coils of slots 53, 54, 1, 2 too.

As stated above, in the electric machine of three-phase, four pole and 54 slot, as the ratio $\beta$ of the winding pitch to the pole pitch can not be 0.833, a coil arrangement of three winding circuitries are described in a case of $\beta$=0.815 in FIG. 1 and FIGS. 8 to 13. In a case of $\beta$=0.889 in FIGS. 14 to 18, a suitable arrangement of the coil constituting the three winding circuitry will be described.

Figure 14:
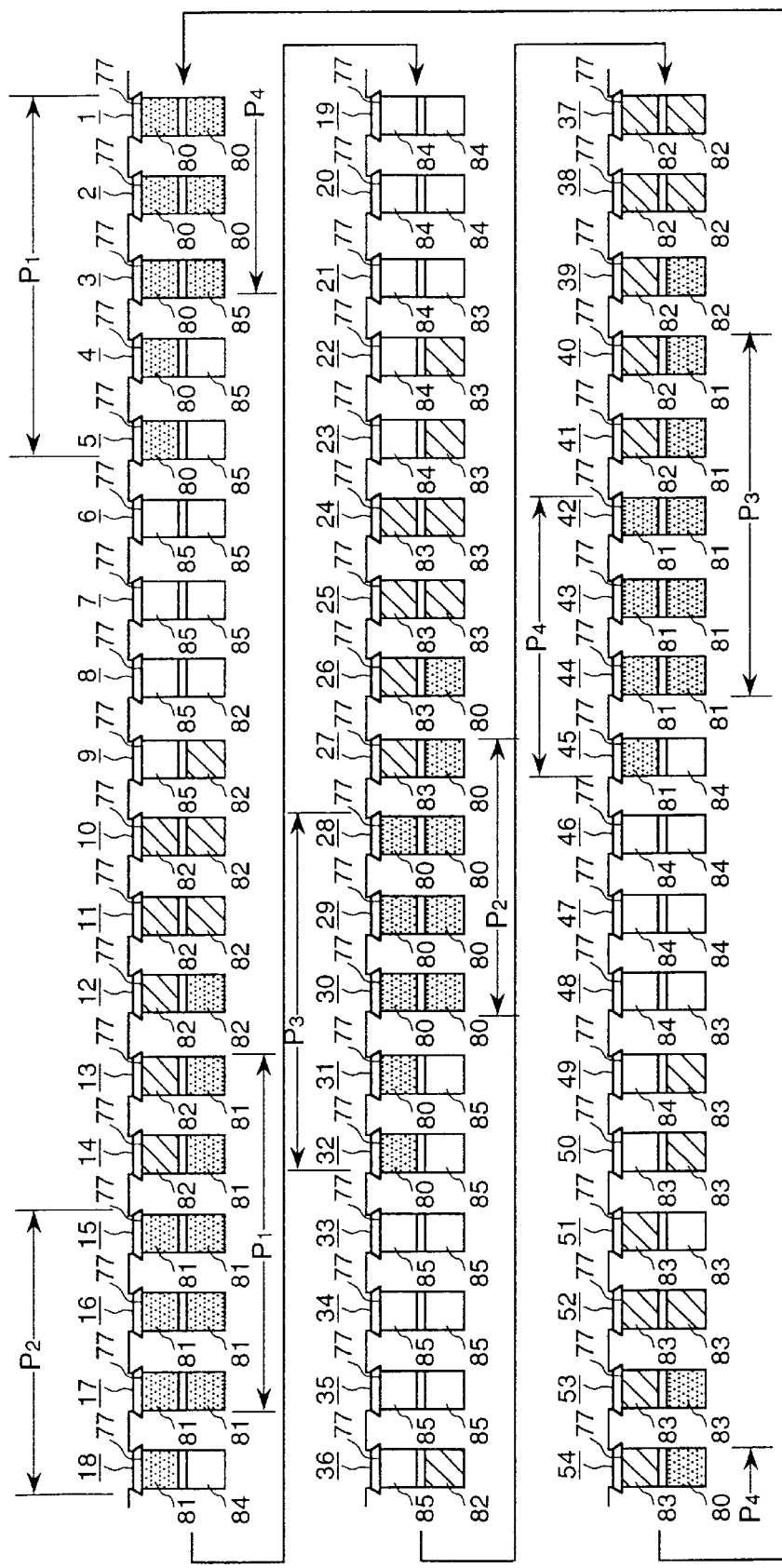
FIG. 14 is a coil arrangement view of the armature winding of the three phase, four pole rotating electric machine showing one embodiment of the present invention.

In the rotating electric machine of three-phase, four pole and 54 slot, an arrangement of the coil of each phase of the armature winding at $\beta$=0.889 is shown in FIG. 14. When a rotational direction of the rotator is towards the slot 1, 2, ..., 71, 72, 1, ..., and the five top coils of slots 1 to 5 provides a U phase coil 80, four top coils of the slots 6 to 9 provides a W phase in the same way as FIG. 8, five top coils of slots 10 to 14 provide a V phase, four top coils of slots 15 to 18 provide a U phase, five top coils of slots 19 to 23 provide a W phase, four top coils of slots 24 to 27 provide a V phase, five top coils of slots 28 to 32 provide a U phase, four top coils of slots 33 to 36 provide a W phase, five top coils of slots 37 to 41 provide a V phase, four top coils of slots 42 to 45 provide a U phase, five top coils of slots 46 to 50 provide a W phase, and four top coils of slots 51 to 54 provide a v phase.

On the other hand, as the winding pitch of the bottom coil is 12, five bottom coils of slots 13 to 17 provide a U phase, four bottom coils of slots 18 to 21 provide a W phase, five bottom coils of slots 22 to 26 provide a V phase, four bottom coils of slots 27 to 30 provide a U phase, five bottom coils of slots 31 to 35 provide a W phase, four bottom coils of slots 36 to 39 provide a V phase, five bottom coils of slots 40 to 44 provide a U phase, four bottom coils of slots 45 to 48 provide a W phase, five bottom coils of slot 49 to 53 provide a V phase, four bottom coils of slots 54, 1, 2, 3 provide a U phase, five bottom coils of slots 4 to 8 provide W phase, and four bottom coils of slots 9 to 12 provide a V phase.

As mentioned above, in the U phase, one pole of P1 is constituted with top coils of slots 1 to 5 and bottom coils of slots 13 to 16, one pole of P2 is constituted with top coils of slots 15 to 18 and bottom coils of slots 27 to 30, one pole of P3 is constituted with top coils of slots 28 too 32 and bottom coils of slots 40 to 44, and one pole of P4 is constituted with top coils of slots 42 to 45 and bottom coils of slots 54, 1, 2, 3.

In addition, as the pole P4 and the pole P3, and the pole P2 and the pole P4 respectively has a same polarity, and the pole P1 and the pole P2 has a different polarity, when a direction of a current to flow in top coils of the slot 1 to 5 is defined to be positive, the current to flow in the bottom coils of the slots 13 to 17 is negative, the current of the top coils of the slots 15 the 18 becomes to be negative, the current of the bottom coils of the slots 27 to 30 becomes to be positive, the current of the top coils of slots 28 to 32 becomes to be positive, the current of the bottom coils of slots 40 to 44 becomes to be negative, the current of the top coils of slots 42 to 45 becomes to be negative, and the current of the bottom coils of the slots 54, 1, 2, 3 becomes to be positive. In FIG. 14, the coil which the current of a positive direction flows in U phase is a coil 80, and the coil which a negative current flows through is a coil 81.

(Similarly, the coil which the positive current flows in V phase is a coil 82, and the coil which a negative current flows through is a coil 83, and the coil which the positive current flows in W phase is a coil 84, and the coil which a negative current flows through is a coil 85.)

Figure 15:
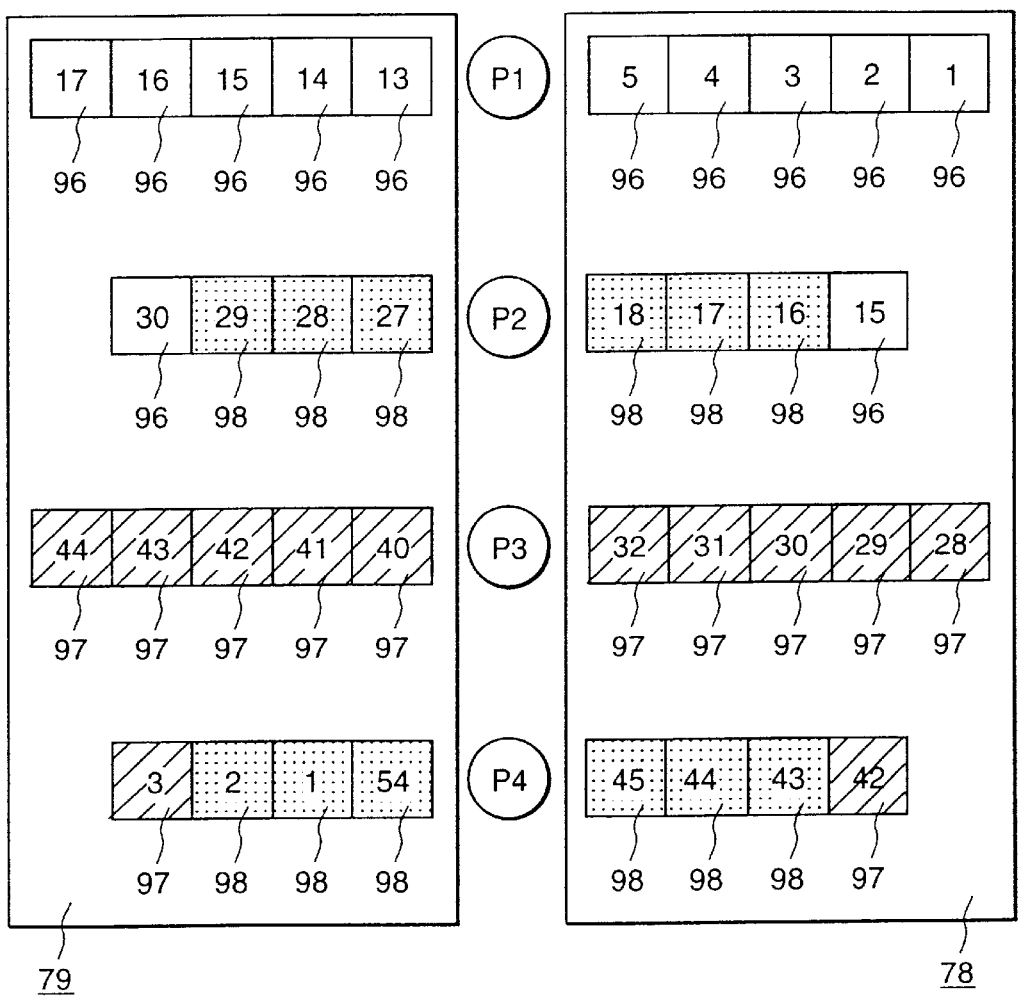
FIG. 15 is a coil arrangement view of the armature winding per one phase of the rotating electric machine showing one embodiment of the present invention.

FIG. 15 shows an arrangement of the three winding circuitry 96 to 98 in U phase coils 80, 81 of FIG. 14. In FIG. 15, the winding circuitry 96 is constituted with the top coils of the slots 1 to 5 and 15 and the bottom coils of the slots 13 to 17 and 30, the winding circuitry 97 is constituted with the top coils of the slots 28 to 32 and 42 and the bottom coils of the slots 40 to 44 and 3, and the winding circuitry 98 is constituted with the top coils of the slots 16 to 18, and 43 to 45 and the bottom coils of the slots 27 to 29, 54, 1 and 2. That is to say, four poles (P1, P2, P3, P4) are constituted with the winding circuitries 96 to 98 as follows.

Pole P1: winding circuitry 96 having five (all) top coils and bottom coils, Pole P2: winding circuitry 96 having a top coil and a bottom coil located fourthly from a winding axis of said pole P2, and winding circuitry 98 having other three top coils and bottom coils, Pole P3: winding circuitry 97 having five (all) top coils and bottom coils, and Pole P4: winding circuitry 97 having a top coil and a bottom coil located fourthly from a winding axis of said pole P4, and winding circuitry 98 having other three top coils and bottom coils.

Therefore, the winding circuitries 96 to 98 are provided across the two poles, and the arrangement of the winding circuitries 96 is completely electrically same as that of the winding circuitry 97, and only the winding circuitry 98 is different arrangement from other two.

When such a coil arrangement is provided, the induced voltage V96 of the winding circuitry 96 becomes as follows.

$$\dot{V}_{96} = \dot{V}_1 + \dot{V}_2 + \dot{V}_3 + \dot{V}_4 + \dot{V}_5 - \dot{V}_{13} - \dot{V}_{14} - \dot{V}_{15} - \dot{V}_{16} - \dot{V}_{17} - \dot{V}_{15} + \dot{V}_{30} = 11.293 V_1 \angle -16.7°$$

The induced voltage V97 of the winding circuitry 97 becomes as follows.

$$\dot{V}_{97} = \dot{V}_{28} + \dot{V}_{29} + \dot{V}_{30} + \dot{V}_{31} + \dot{V}_{32} - \dot{V}_{40} - \dot{V}_{41} - \dot{V}_{42} - \dot{V}_{43} - \dot{V}_{44} - \dot{V}_{42} + \dot{V}_{30} = 11.293 V_1 \angle -16.7°$$

The induced voltage V98 of the winding circuitry 98 becomes as follows.

$$\dot{V}_{98} = -\dot{V}_{16} - \dot{V}_{17} - \dot{V}_{18} + \dot{V}_{27} + \dot{V}_{28} + \dot{V}_{29} - \dot{V}_{43} - \dot{V}_{44} - \dot{V}_{45} + \dot{V}_{54} + \dot{V}_1 + \dot{V}_2 = 11.289 V_1 \angle -16.7°$$

The induced voltages of the winding circuitries 96 and 97 are equal each other, and the induced voltage of the winding circuitry 98 becomes smaller only 0.004V1 than those of the winding circuitries 96 and 97.

Accordingly when the coil is arranged as FIG. 15, as the all winding circuitries are not arranged across the poles equal to or more than 3, there is no need to increase number of the line unnecessarily. In addition, as two of the three winding circuitries are completely electrically arranged in the same way, they can be produced easily, and as the phases of the induced voltages of three winding circuitries are equal, the voltage unbalance between the winding circuitries can be very small to be negligible as 0.004/11.039×100= 0.04%.

Figure 16:
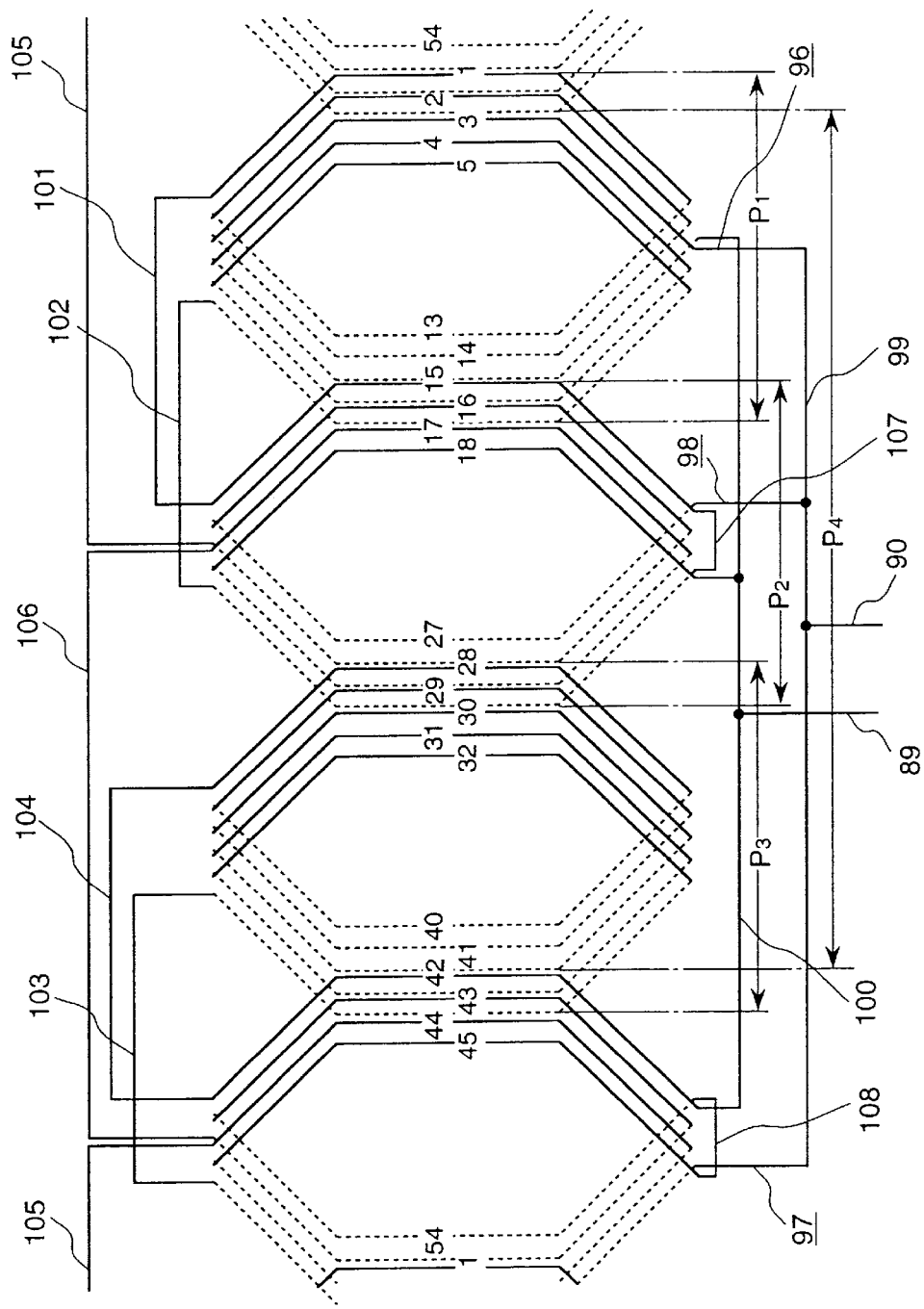
FIG. 16 is a connection diagram which shows one embodiment the present invention.

FIG. 16 is one example of the connection diagram on the basis of the coil arrangement shown in FIG. 15.

In FIG. 16, when the lead-wire 90 is arranged in the neutral point side, the lead-wire 89 becomes to be arranged to the output terminal side. Accordingly, the winding circuitry 96 is arranged from the line 99 in a sequence of the top coil of the slot 3, the bottom coil of the slot 14, the top coil of the slot 2, the bottom coil of the slot 13, the top coil of the slot 1, the line 101, the top coil of the slot 15, the line 107, the bottom coil of the slot 30, the line 102, the bottom coil of the slot 17, the top coil of the slot 5, the bottom coil of the slot 16, the top coil of the slot 4, the bottom coil of the slot 15, and the line 100.

On the other hand, the winding circuitry 97 is arranged from the line 99 in a sequence of the bottom coil of the slot 3, the line 103, the bottom coil of the slot 44, the top coil of the slot 32, the bottom coil of the slot 43, the top coil of the slot 31, the bottom coil of the slot 42, the top coil of the slot 30, the bottom coil of the slot 41, the top coil of the slot 29, the bottom coil of the slot 40, the top coil of the slot 28, the line 104, the top coil of the slot 42, and the line 100.

The winding circuitry 98 is arranged from the line 99 in a sequence of the bottom coil of the slot 27, the top coil of the slot 16, the bottom coil of the slot 28, the line 105, the top coil of the slot 44, the bottom coil of the slot 2, the top coil of the slot 45, the line 108, the bottom coil of the slot 54, the top coil of the slot 43, the bottom coil of the slot 1, the line 106, the top coil of the slot 17, the bottom coil of the slot 29, the top coil of the slot 18, and the line 100.

When connected in this way, although the lines 107 and 108 become necessary, in a side of the lines 101 to 106, the pitch to connect the top coil and the bottom coil becomes to be 11 (for example, the top coil of the slot 2 and the bottom coil of the slot 13), and in a side of the lead-wire 89, 90, all the pitch to connect the top coil and the bottom coil becomes to be 12 except a specified point, (for example, the top coil of the slot 1 and the bottom coil of the slot 13). Accordingly, as there is not a point to be connected to with specified pitch, connection of the coil end does not become complicated.

Here, FIG. 16 is one example of the connection diagram on the basis of the coil arrangement shown in FIG. 15.

As shown in FIG. 16, the winding pitch cannot be constant without making the winding pitch of the standard "12" in the lead-wire side and making the winding pitch of the standard "11" in an opposite side of the lead-wire side.

Figure 17:
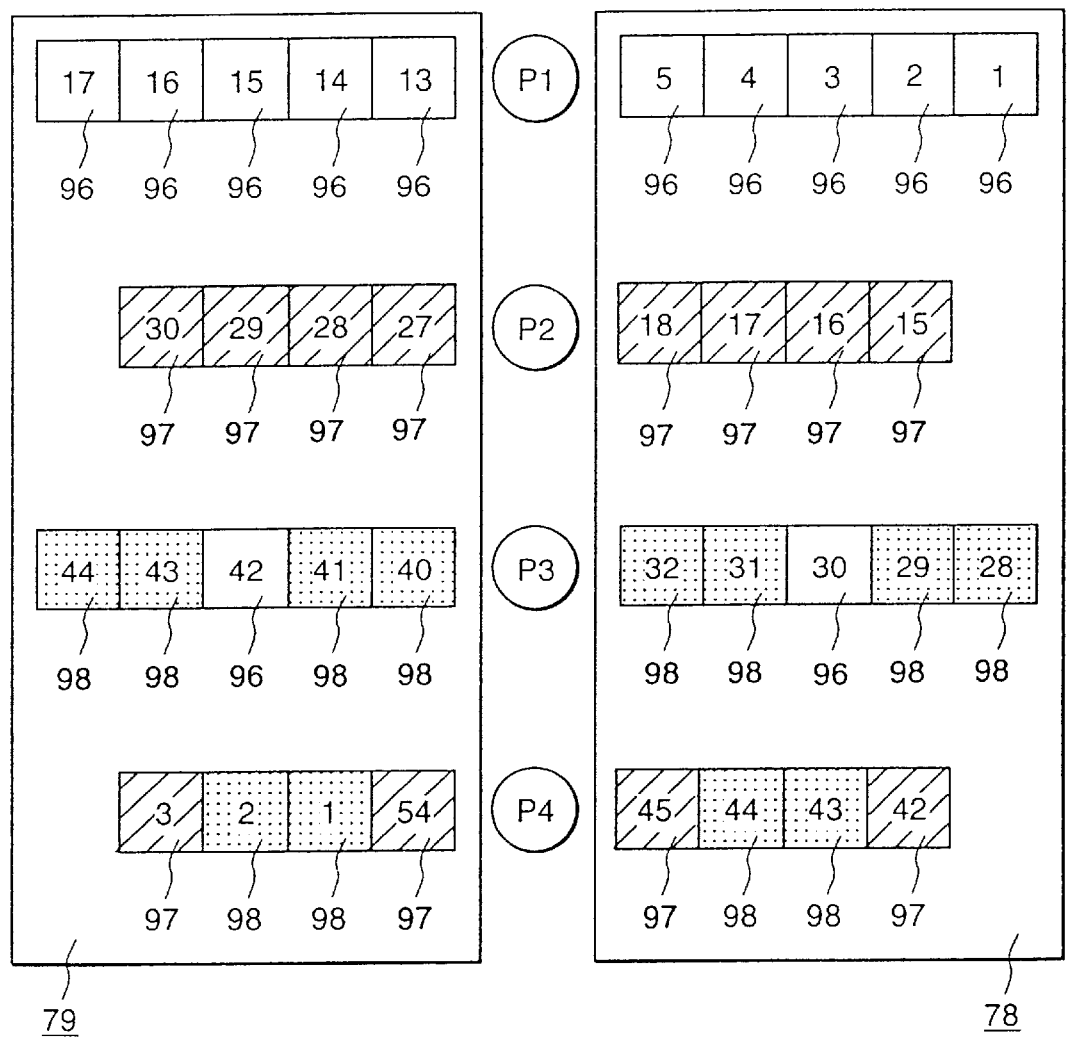
FIG. 17 is a coil arrangement view of the armature winding per one phase of the rotating electric machine showing one embodiment of the present invention.

A coil arrangement of the three winding circuitries as an other embodiment of the present invention will be shown in FIG. 17, in the same way as FIG. 1 relating to one phase. In FIG. 17, the winding circuitries 96 to 98 are arranged in an electrically different way, however, the coils which constitutes the winding circuitries 96 to 98 are not arranged across the poles equal to or more than 3. The winding circuitry 96 is constituted with the top coils of the slots 1 to 5 and 30 and the bottom coils of the slots 13 to 17 and 42, the winding circuitry 97 is constituted with the top coils of the slots 15 to 18 and 42, 45 and the bottom coils of the slots 27 to 30, 54 and 3, and the winding circuitry 98 is constituted with the top coils of the slots 28, 29, 31, 32, 43 and 44 and the bottom coils of the slots 40, 41, 43, 44, 1 and 2. That is to say, four poles (P1, P2, P3, P4) are constituted with the winding circuitries 96 to 98 as follows.

Pole P1: winding circuitry 96 having five (all) top coils and bottom coils, Pole P2: winding circuitry 97 having five (all) top coils and bottom coils.

Pole P3: winding circuitry 96 having a top coil and a bottom coil located thirdly from a winding axis of said pole P3, and winding circuitry 98 having other coils, and Pole P4: winding circuitry 97 having a top coil and a bottom coil located firstly and fourthly from a winding axis of said pole P4 and winding circuitry 98 having top coils and bottom coils located secondly and thirdly from a winding axis of said pole P4.

When such a coil arrangement is provided, the induced voltage V96 of the winding circuitry 96 becomes as follows.

$$\dot{V}_{96} = \dot{V}_1 + \dot{V}_2 + \dot{V}_3 + \dot{V}_4 + \dot{V}_5 - \dot{V}_{13} - \dot{V}_{14} - \dot{V}_{15} - \dot{V}_{16} - \dot{V}_{17} + \dot{V}_{30} - \dot{V}_{42} = 11.293 \dot{V}_1 \angle -16.7°$$

The induced voltage V97 of the winding circuitry 97 becomes as follows.

$$\dot{V}_{97} = -\dot{V}_{15} - \dot{V}_{16} - \dot{V}_{17} - \dot{V}_{18} + \dot{V}_{27} + \dot{V}_{28} + \dot{V}_{29} + \dot{V}_{30} - \dot{V}_{42} - \dot{V}_{45} + \dot{V}_{54} + \dot{V}_3 = 11.316 \dot{V}_1 \rightarrow 16.7°$$

The induced voltage V98 of the winding circuitry 98 becomes as follows.

$$\dot{V}_{98} = \dot{V}_{28} + \dot{V}_{29} + \dot{V}_{31} + \dot{V}_{32} - \dot{V}_{40} - \dot{V}_{41} - \dot{V}_{43} - \dot{V}_{44} - \dot{V}_{43} - \dot{V}_{44} + \dot{V}_1 + \dot{V}_2 = 11.266 \dot{V}_1 \angle -16.7°$$

Therefore, the voltage unbalance between winding circuitry becomes at most as follows.

$$(11.316 \text{ to } 11.266)/11.316 \times 100 = 0.44\%$$

Accordingly when the coil is arranged as FIG. 17, as the all winding circuitries are not arranged across the poles equal to or more than 3, number of the line can be minimum. In addition, as the phases of the induced voltages of three winding circuitries are equal, the voltage unbalance between the winding circuitries can be very small as 0.44%.

Figure 18:
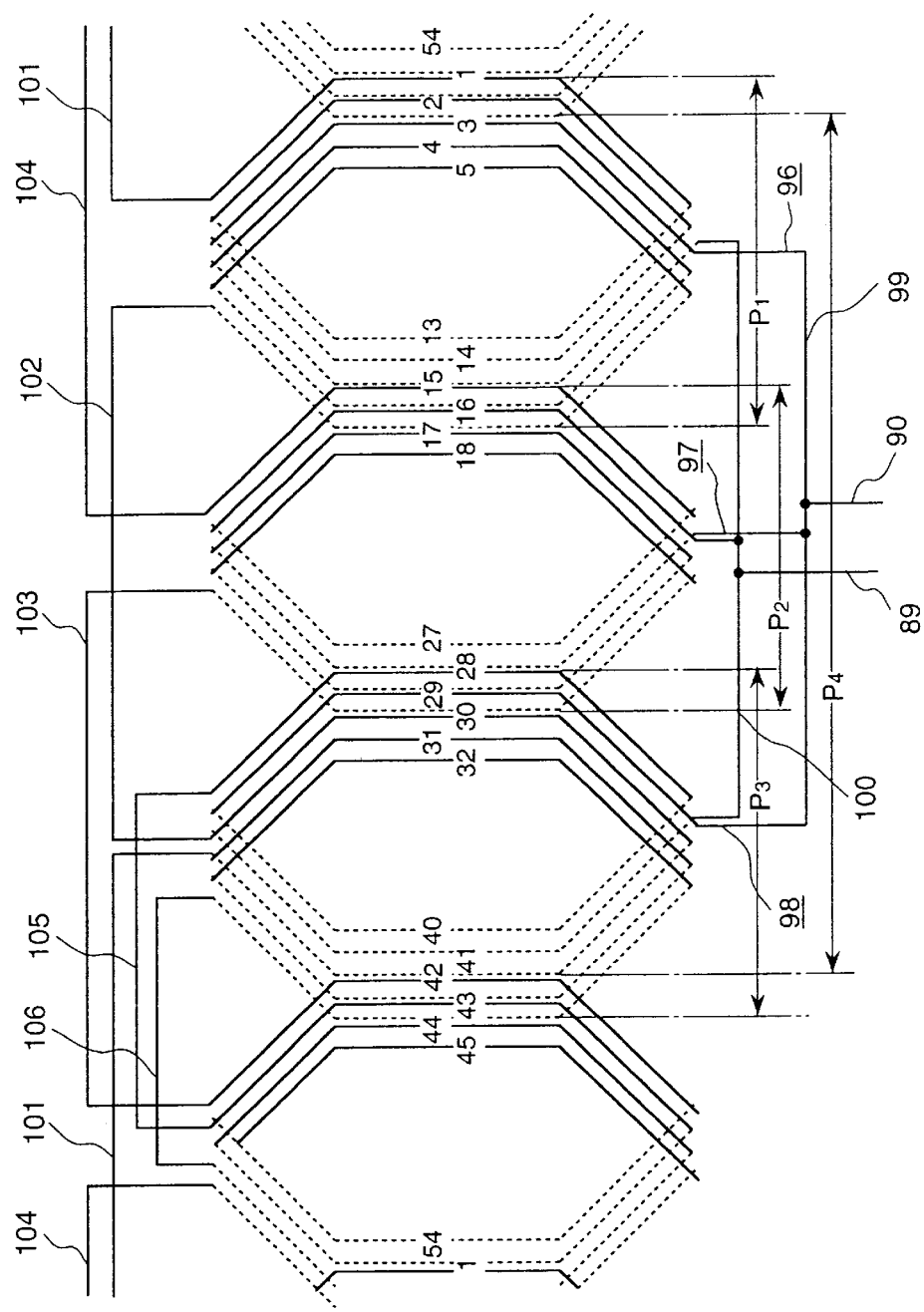
FIG. 18 is a connection diagram which shows one embodiment of the present invention.

FIG. 18 is one example of the connection diagram on the basis of the coil arrangement shown in FIG. 17. In FIG. 18, when the lead-wire 90 is arranged in the neutral point side, the lead-wire 89 becomes to be arranged to the output terminal side. Accordingly, the winding circuitry 96 is arranged from the line 99 in a sequence of the top coil of the slot 3, the bottom coil of the slot 14, the top coil of the slot 2, the bottom coil of the slot 13, the top coil of the slot 1, the line 101, the bottom coil of the slot 42, the top coil of the slot 30, the line 102, the bottom coil of the slot 17, the top coil of the slot 5, the bottom coil of the slot 16, the top coil of the slot 4, the bottom coil of the slot 15, and the line 100.

The winding circuitry 97 is arranged from the line 99 in a sequence of the bottom coil of the slot 28, the top coil of the slot 17, the bottom coil of the slot 29, the top coil of the slot 18, the bottom coil of the slot 30, the line 103, the top coil of the slot 42, the bottom coil of the slot 54, the top coil of the slot 45, the bottom coil of the slot 3, the line 104, the top coil of the slot 15, the bottom coil of the slot 27, the top coil of the slot 16, and the line 100.

The winding circuitry 98 is arranged from the line 99 in a sequence of the top coil of the slot 29, the bottom coil of the slot 40, the top coil of the slot 28, the line 105, the top coil of the slot 43, the bottom coil of the slot 1, the top coil of the slot 44, the bottom coil of the slot 2, the line 106, the top coil of the slot 44, the bottom coil of the slot 2, the line 106, the bottom coil of the slot 44, the top coil of the slot 32, the bottom coil of the slot 43, the top coil of the slot 31, the bottom coil of the slot 41, and the line 100.

When connected in this way, in a side of the lines 101 to 106, the pitch to connect the top coil and the bottom coil becomes to be 11 except a specified point, (for example, the top coil of the slot 2 and the bottom coil of the slot 13), and in a side of the lead-wire 89, 90, all the pitch to connect the top coil and the bottom coil becomes to be 12, (for example, the top coil of the slot 1 and the bottom coil of the slot 13). A point to be connected to with a specified pitch is totally three places (nine places in the three-phase circuit) of the top coil of the slot 31 and the bottom coil of the slot 41, the top coil of the slot 44 and the bottom coil of the slot 1, and the top coil of the slot 45 and the bottom coil of the slot 54.

Here, FIG. 18 is one example of the connection diagram on the basis of the coil arrangement shown in FIG. 17. As shown in FIG. 17, in order to make point to be connected with a specified winding pitch minimum, it is desirable to make the winding pitch of the standard "12" in the lead-wire side and to make the winding pitch of the standard "11" in an opposite side of the lead-wire side as shown in FIG. 17.

In FIGS. 14 to 18, it is explained as that pole P1 is constituted with top coils of slots 1 to 5 and bottom coils of slots 13 to 17, pole P2 is constituted with top coils of slots 15 to 18 and bottom coils of slots 27 to 30, pole P3 is constituted with top coils of slots 28 to 32 and bottom coils of slots 40 to 44, and pole P4 is constituted with top coils of slots 42 to 45 and bottom coils of slots 54, 1 to 3.

However, pole P1 may be constituted with bottom coils of slots 1 to 5 and top coils of slots 13 to 17, pole P2 may be constituted with bottom coils of slots 15 to 18 and top coils of slots 27 to 30, pole P3 may be constituted with bottom coils of slots 28 to 32 and top coils of slots 40 to 44, and pole P4 may be constituted with bottom coils of slots 42 to 45 and top coils of slots 54, 1 to 3 too.

According to the above embodiment, as the winding circuitries are not arranged across the poles equal to or more than 3, there is no need to increase number of the line and edge structure of the armature winding can be simplified.

In addition, the voltage unbalance between the winding circuitries can be very small. As a result, A partial temperature-rise of the armature winding by a circulating current can be restrained, and cost of the generator can be restrained to become higher.

According to the present invention, the voltage unbalance between three winding circuitries of each phase can be smaller, and the edge construction of the armature winding can be restrained to become complicated.

In the above embodiment, as the present invention is applied to the armature winding of the rotating electric machine having the three phase, three winding circuits and four poles, it is effective in the armature winding having the slots from 18 (9n, n=2) at minimum to 63 (9n, n=7) at muxmum.

What is claimed is:

1. An armature winding of a four pole rotating electric machine provided with a three-phase star connection, each phase of said three-phase star connection being constructed with three winding circuits connected in parallel, and having a stator core provided with slots of 9n ($2 \leq n \leq 7$) pieces, each of said slots being provided with double-layer windings, comprising:

two of said four poles in said each phase being constituted with only one of said three winding circuits.

2. An armature winding of a four pole rotating electric machine provided with a three-phase star connection, each phase of said three-phase star connection being constructed with three winding circuits connected in parallel, and having a stator core provided with slots of 54 pieces, each of said slots being provided with double-layer windings, comprising:

two of said four poles in said each phase being constituted with only one of said three winding circuits.

3. An armature winding of a rotating electric machine as defined in claim 2, wherein a ratio of a winding pitch to a pole pitch of said armature winding is 81.5%, and said four poles P1, P2, P3, P4 formed with said three winding circuits consist of first to third winding circuits in each phase, in which:

said pole P1 is formed with five top coils and five bottom coils of said first winding circuit;

said pole P2 is formed with said third winding circuit having three top coils and three bottom coils and said first winding circuit having a top coil and a bottom coil each located third from a winding axis of said pole P2;

said pole P3 is formed with said second winding circuit having five top coils and five bottom coils; and said pole P4 is formed with said third winding circuit having three top coils and three bottom coils, and said second winding circuit having a top coil and a bottom coil each located third from a winding axis of said pole P4.

4. An armature winding of a rotating electric machine as defined in claim 2, wherein a ratio of a winding pitch to a pole pitch of said armature winding is 81.5%, and said four poles P1, P2, P3, P4 formed with said three winding circuits consist of first to third winding circuits in each phase, in which:

said pole P1 is formed with said first winding circuit having five top coils and five bottom coils;

said pole P2 is formed with said second winding circuit having two top coils and two bottom coils, and said third winding circuit having a top coil and a bottom coil located second and fourth, respectively from a winding axis of said pole P2;

said pole P3 is formed with said third winding circuit having four top coils and four bottom coils, and said first winding circuitry having a top coil and a bottom coil each located third from a winding axis of said pole P3, and said pole P4 is formed with said second winding circuit having four top coils and four bottom coils.

5. An armature winding of a rotating electric machine as defined in claim 2, wherein a ratio of a winding pitch to a pole pitch of said armature winding is 81.5%, and said four poles P1, P2, P3, P4 formed with said three winding circuits consist of first to third winding circuits in each phase, in which:

said pole P1 is formed with said first winding circuitry having five top coils and five bottom coils;

said pole P2 is formed with said second winding circuit having two top coils and two bottom coils and said third winding circuit having a top coil and a bottom coil located second and third, respectively, from a winding axis of said pole P2;

said pole P3 is formed with said third winding circuit having four top coils and four bottom coils and said first winding circuit having a top coil and a bottom coil each located third from a winding axis of said pole P3; and said pole P4 is formed with said second winding circuit having four top coils and four bottom coils.

6. An armature winding of a rotating electric machine as defined in claim 2, wherein a ratio of a winding pitch to a pole pitch of said armature winding is 88.9%, and said four poles P1, P2, P3, P4 formed with said three winding circuits consist of first to third winding circuit in each phase, in which:

said pole P1 is formed with said first winding circuit having five top coils and five bottom coils;

said pole P2 is formed with said third winding circuit having three top coils and three bottom coils, and said first winding circuit having a top coil and a bottom coil each located fourth from a winding axis of said pole P2;

said pole P3 is formed with said second winding circuit having five top coils and five bottom coils; and said pole P4 is formed with said third winding circuit having three top coils and three bottom coils, and said second winding circuit having a top coil and a bottom coil each located fourth from a winding axis of said pole P4.

7. An armature winding of a rotating electric machine as defined in claim 2, wherein a ratio of a winding pitch to a pole pitch of said armature winding is 88.9%, and said four poles P1, P2, P3, P4 formed with said three winding circuits consist of first to third winding circuits in each phase, in which:

said pole P1 is formed with said first winding circuit having five top coils and five bottom coils;

said pole P2 is formed with said second winding circuit having four top coils and four bottom coils;

said pole P3 is formed with said third winding circuit having four top coils and four bottom coils, and said first winding circuit having a top coil and a bottom coil each located third from a winding axis of said pole P3; and said pole P4 is formed with said third winding circuit having two top coils and two bottom coils, and said second winding circuit having a top coil and a bottom coil located first and fourth from a winding axis of said pole P4.

8. An armature winding of a four pole rotating electric machine provided with a three-phase star connection, each phase of said three-phase connection being constructed with three winding circuits connected in parallel, and having a stator core provided with slots of 9n (n=1, 2, 3, - - - ) pieces, each of said slots being provided with double-layer windings, comprising:

two of said four poles in said each phase being constituted with only one of said three winding circuits.

9. A rotating electric machine having slots 1 to 54 arranged from 1, 2, 3, . . . , 53, 54, 1, 2, . . . in a circumferential direction sequentially, and having four poles P1, P2, P3, P4 formed with said three winding circuits consisting of first to third winding circuits in one phase with a ratio β of a pole pitch to a winding pitch=11/13.5=0.815, wherein pole P1: said first winding circuit is provided with top coils of slots 1–5 and bottom coils of slots 12–16;

pole P2: said first winding circuit is provided with a top coil of slot 16 and a bottom coil of said slot 28, and said third winding circuit is provided with top coils of slots 15, 17, 18 and bottom coils of slots 26, 27, 29;

pole P3: said second winding circuit is provided with top coils of slots 28–32 and bottom coils of slots 39–43; and pole P4: said second winding circuit is provided with a top coil of slot 43 and a bottom coil of slot 1, and said third winding circuit is provided with top coils of slots 42, 44, 45 and bottom coils of slots 53, 54, 2.

10. A rotating electric machine having fifty-four slots for a three phase stator, and four poles P1, P2, P3, P4 formed with first to third winding in each phase, wherein pole P1: said first winding circuit provided with all five top coils and all five bottom coils;

pole P2: said first winding circuit is provided with a third top coil and a third bottom coil relative to a winding axis of the pole P2, and said third winding circuit is provided with the first, second and fourth top coils and first, second and fourth bottom coils said winding axis of the pole P2;

pole P3: said second winding circuit is provided with all five top coils and all five bottom coils; and pole P4: said second winding circuit is provided with a third top coil and a third bottom coil relative to a winding axis of the pole P4, and said third winding circuit is provided with first, second and fourth top coils and first, second and fourth bottom coils relative to said winding axis of the pole P4.

* * * * *